United States Patent [19]

Chapman, III

[11] 3,724,589
[45] Apr. 3, 1973

[54] WELL LOGGING METHODS AND APPARATUS

[75] Inventor: Joseph E. Chapman, III, Houston, Tex.

[73] Assignee: Schlumberger Technology Corporation, New York, N.Y.

[22] Filed: May 26, 1969

[21] Appl. No.: 827,799

[52] U.S. Cl..........181/.5 BI, 181/.5 AC, 340/15.5 TI, 340/18 P, 340/15.5 AP
[51] Int. Cl. ..............................................G01v 1/22
[58] Field of Search ........178/7.3; 181/.5; 340/18, 15

[56] References Cited

UNITED STATES PATENTS

| | | | |
|---|---|---|---|
| 3,609,366 | 9/1971 | Schwartz | 250/83.3 |
| 3,502,169 | 3/1970 | Chapman | 181/.5 |
| 3,304,537 | 2/1967 | Schwartz | 340/18 |
| 2,596,023 | 5/1952 | Goble et al. | 181/.5 |
| 2,595,241 | 5/1962 | Goble | 177/352 |
| 3,503,038 | 3/1970 | Baldwin | 340/18 |
| 3,369,626 | 2/1968 | Zemaner | 340/18 |
| 3,427,580 | 2/1969 | Brock | 340/18 |
| 3,182,124 | 5/1965 | Nurse | 178/7.3 |
| 3,204,027 | 7/1965 | Clements | 178/7.3 |
| 3,301,951 | 1/1967 | Humphrey | 178/7.3 |
| 3,402,388 | 9/1968 | Tucker | 181/.5 |
| 3,424,268 | 1/1969 | Vogel | 181/.5 |
| 435,224 | 3/1969 | Zemaner, Jr. | 181/.5 |
| 3,434,568 | 3/1969 | Caldwell | 181/.5 |
| 3,456,754 | 7/1969 | Zemaner, Jr. | 181/.5 |
| 3,457,544 | 7/1969 | Miller et al. | 181/.5 DR |
| 3,478,839 | 9/1969 | Zemaner, Jr. | 181/.5 |
| 3,488,661 | 1/1970 | Tanguy | 181/.5 DR |
| 3,490,150 | 1/1970 | Whiteill, Jr. | 181/.5 DR |

FOREIGN PATENTS OR APPLICATIONS

| | | |
|---|---|---|
| 1,423,605 | 11/1965 | France |
| 818,086 | 7/1969 | Canada |
| 139,359 | 6/1964 | Argentina |

*Primary Examiner*—Benjamin A. Borchelt
*Assistant Examiner*—N. Moskowitz
*Attorney*—Ernest R. Archambeau, Jr., John P. Sinnott, David L. Moseley, Edward M. Roney, William R. Sherman and William J. Beard

[57] ABSTRACT

In accordance with an illustrative embodiment of the present invention, a well tool having a rotating transducer means is moved through a well bore. The transducer means is repetitively energized to emit acoustic energy into the media surrounding the well tool, which energy is reflected off various circumferential portions of the well bore wall and returned to the rotating transducer means. An electrical signal pulse is developed in response to each burst of reflected energy received by the transducer means and this pulse, along with an electrical sync pulse representative of the time at which the transducer is energized, are transmitted to the surface of the earth via a receiver or signal pulse channel in the well tool. The signal gain in the receiver channel can be adjusted as desired, from the surface of the earth by sending a digital coded signal to the well tool from the earth's surface.

At the earth's surface, the sync and signal pulses are first normalized by a circuit which operates to maintain the peak sync pulse amplitude, on the average, substantially equal to a selected reference amplitude. The normalized signal pulses, after processing by suitable picture adjustment circuits, are utilized to modulate the intensity of an oscilloscope electron beam being swept across a record medium in synchronism with the rotation of the transducer means. The picture adjustment circuits include contrast and brightness control circuits. A monitor oscilloscope is also provided for visually displaying the sync and signal pulses.

Earth's field and fixed field magnetometers located in the well tool provide orientation signals as well as enabling synchronization of the sweep electron beam with the rotating transducer means. Moreover, the magnetometer signals are combined to provide an indication of the azimuth of the well tool.

Additionally, caliper circuits are responsive to the time relationship of the sync and signal pulses for providing information concerning the well bore diameter, well bore eccentricity, as well as information as to the authenticity of these caliper measurements.

45 Claims, 55 Drawing Figures

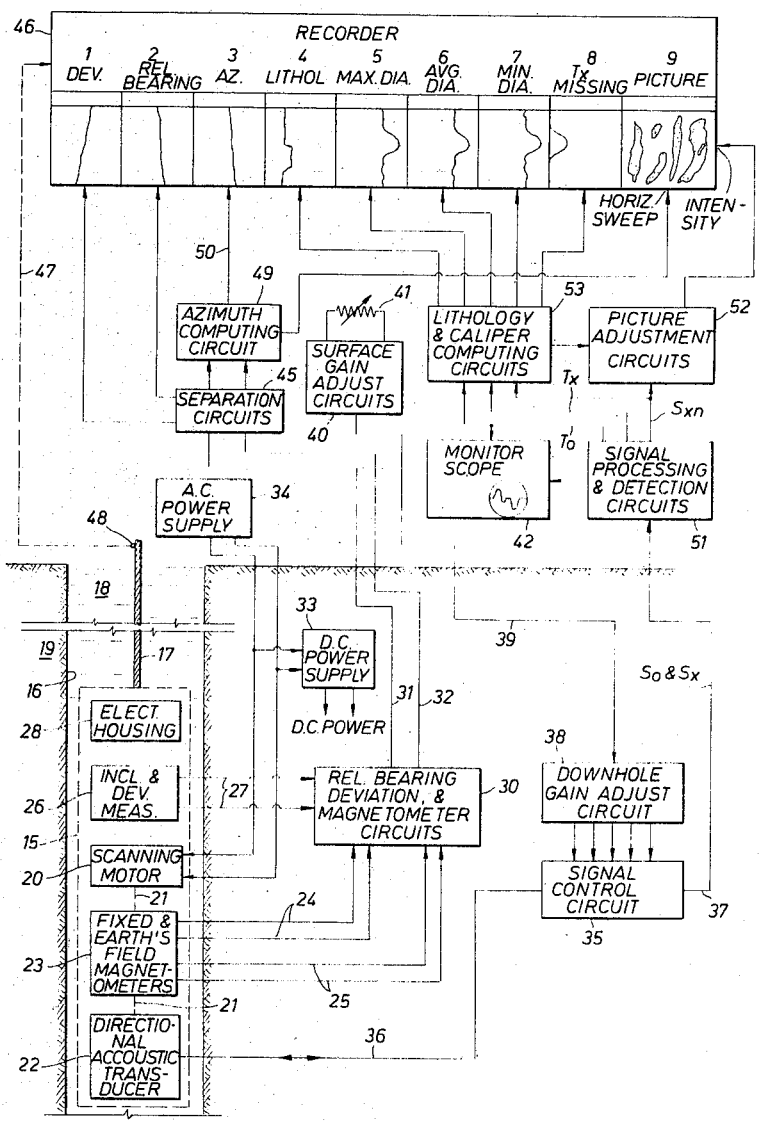

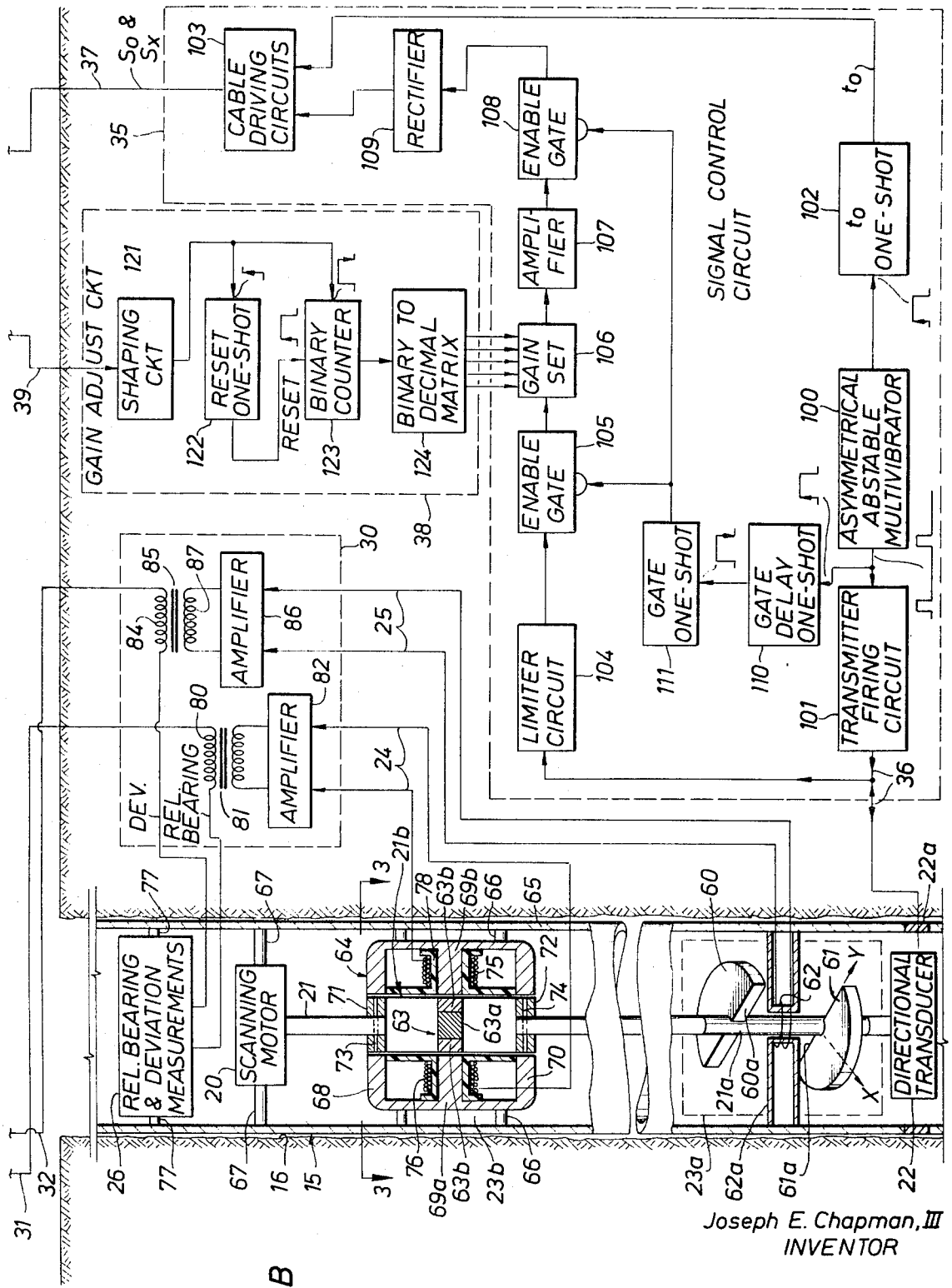

Joseph E. Chapman, III
INVENTOR

BY *Edward M. Roney*
ATTORNEY

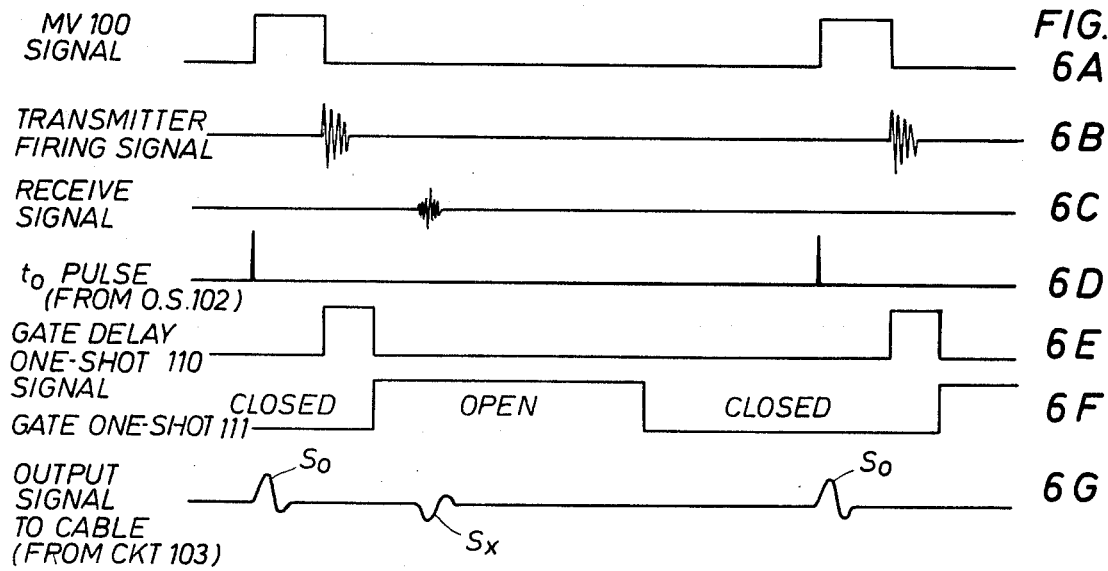
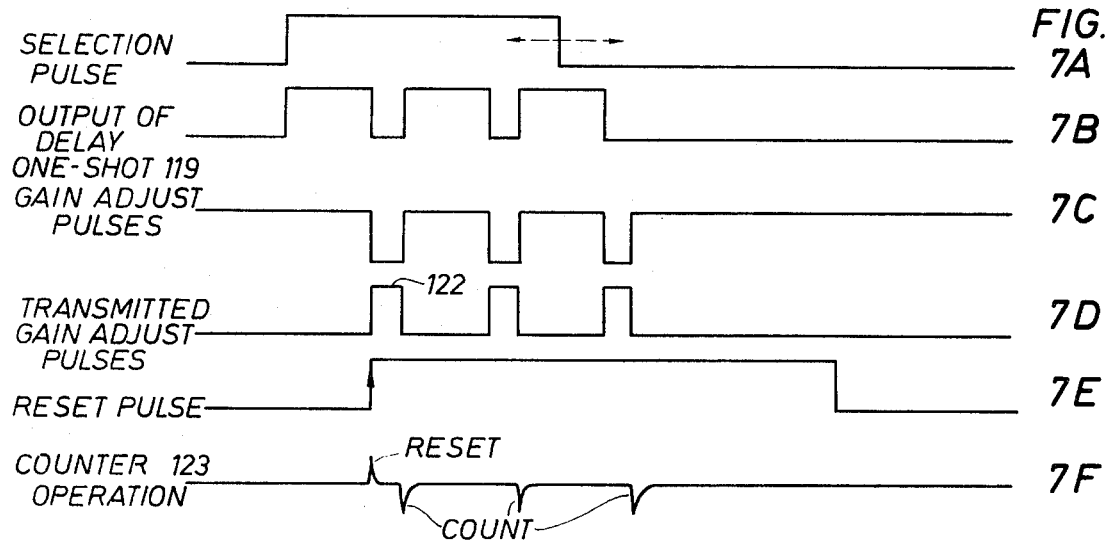
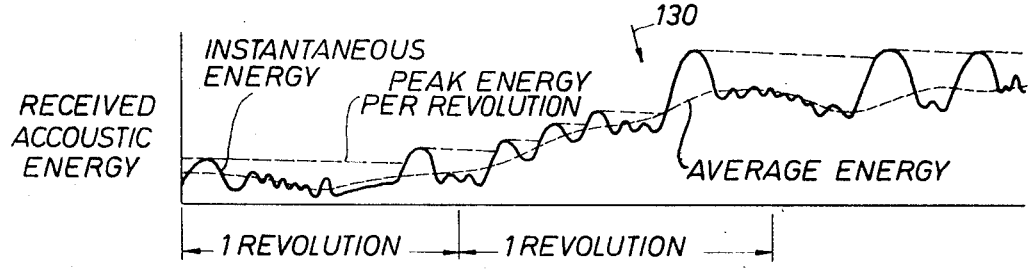

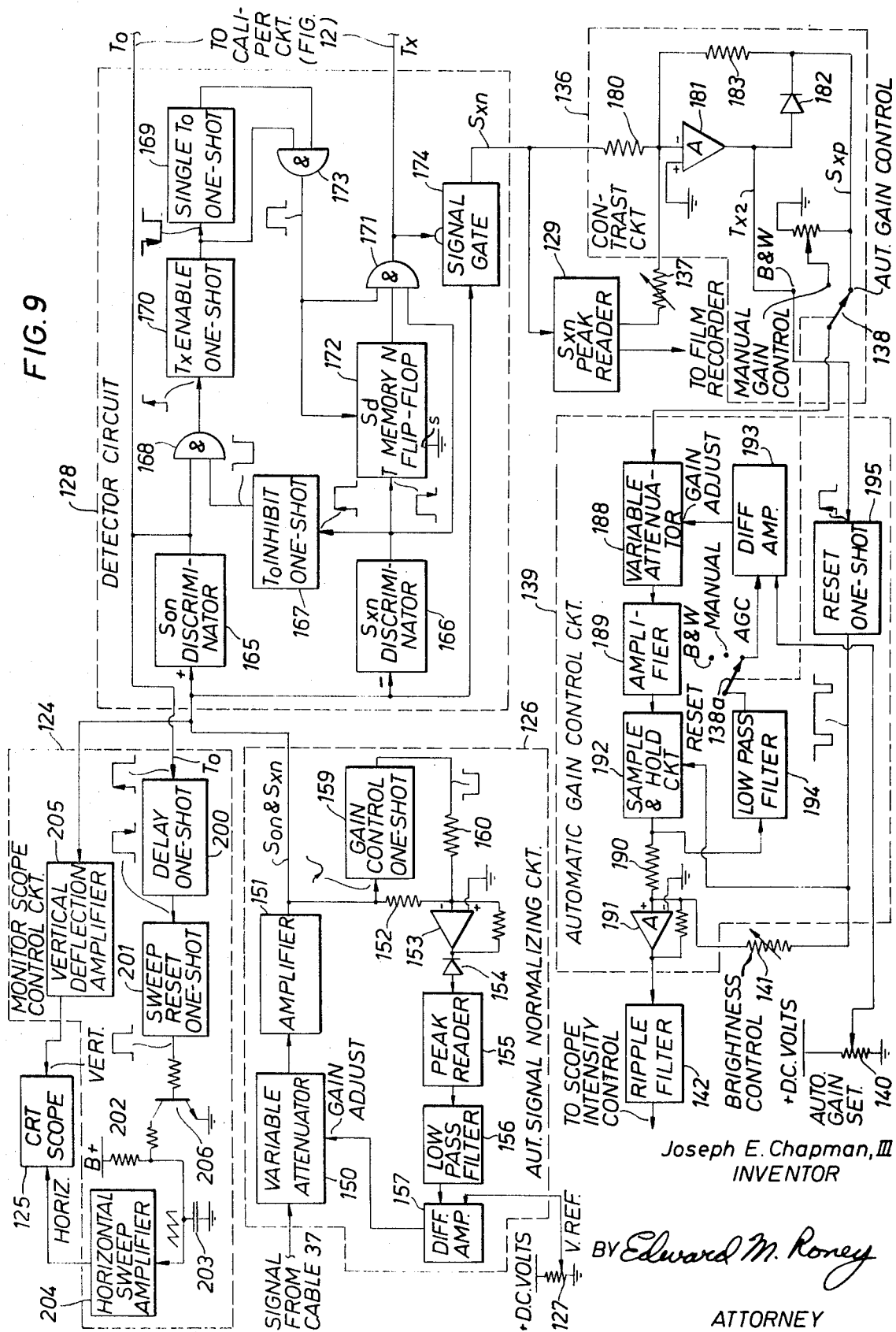

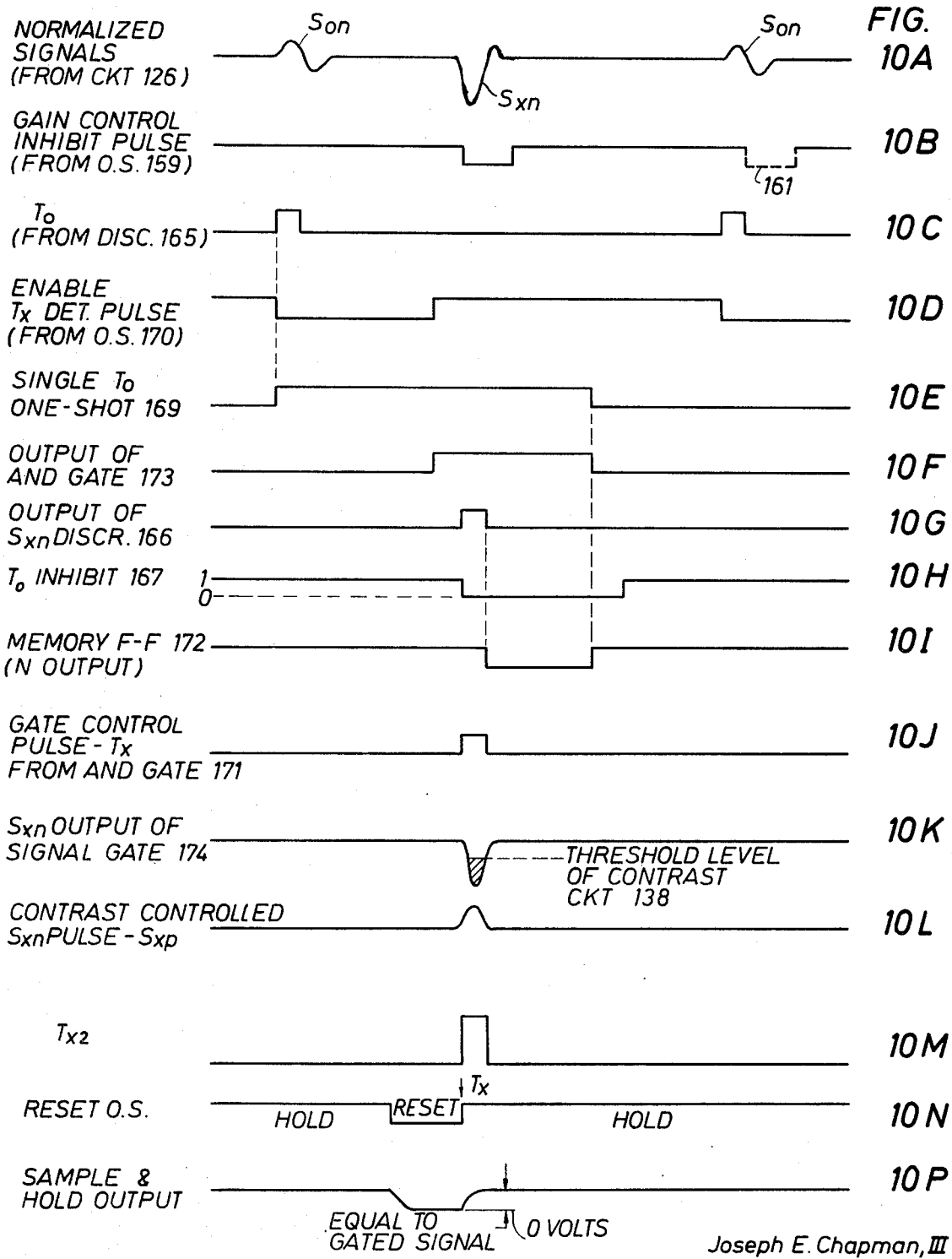

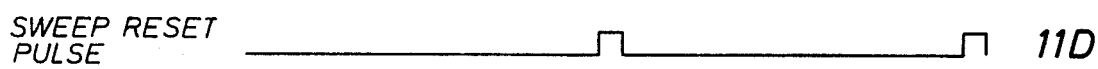
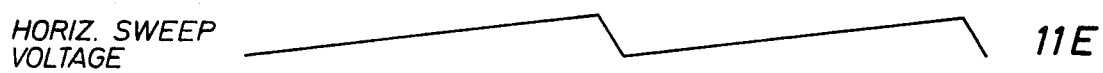
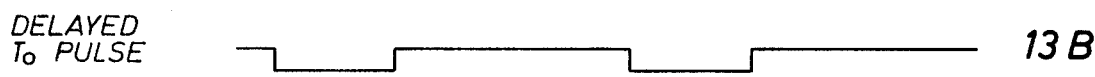
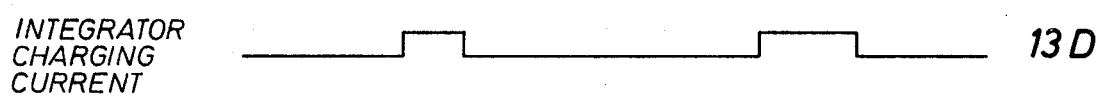
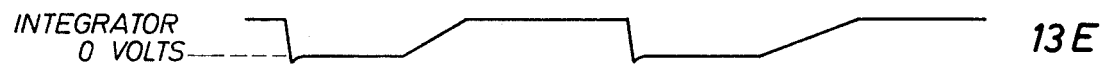
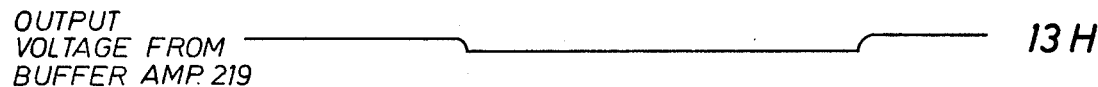

WELL LOGGING METHODS AND APPARATUS

This invention relates to methods and apparatus for investigating the media forming a well bore, and more particularly, to that type of well logging system which employs transmission of acoustic energy and measurement of energy reflected from the wall of the well bore.

In well bore systems of the type involved here, the well bore is scanned through 360° by a rotating transducer means which repetitively emits directional bursts of high frequency acoustic energy during each rotation while it is moved through the well bore. For each burst of transmitted energy, the reflected energy is detected and is primarily dependent upon the character of the media surrounding the well tool including the mud velocity, distance to the well bore wall, and formation acoustic impedance if the well bore is uncased or, if cased, the effect of the casing.

The reflected energy converted to pulse signals is displayed on an oscilloscope where the horizontal sweep of the scope beam is synchronized to the rotation of the transducer to provide one sweep for each 360° rotation. Each beam sweep is synchronized with an azimuthal orientation of the transducer.

A recording medium moves past the face of the oscilloscope in synchronism with the movement of the well tool through the well bore to provide a picture of the media comprising the well bore wall.

It is an object of the present invention to provide new and improved methods and apparatus for scanning the media surrounding a well tool and providing a log presentation which can include one or more of the following: a picture of the wall of the well bore, deviation, relative bearing, azimuth, lithology, maximum diameter, minimum diameter, average diameter, or a missing signal indication.

It is a further object of the present invention to provide new and improved signal processing methods and apparatus for use in well logging systems.

The present invention involves well logging methods and apparatus where a well tool is passed through a liquid-filled well bore. The well tool has means, for example an acoustic transducer device, for repetitively and directionally emitting and receiving energy in the media surrounding the well tool and producing electrical signal pulses representative of the received energy as well as electrical sync pulses representative of the time of energy emission. The energy emitting and receiving means is rotated so that the emitted energy will be sequentially directed at various circumferential portions of the well bore wall. These pulses are transmitted to the surface of the earth for further processing.

The average amplitude level of the signal pulses can vary quite extensively due to various factors. For example, in an open hole, the amount of energy reflected off the well bore wall and back to the well tool is a function of the acoustic impedance of the formation adjoining the well bore. Thus, the average amplitude level of the signal pulses will typically change when the well tool moves from one formation to another. In this connection, the present invention provides the capability of controlling the average amplitude level of the signal pulses which are transmitted to the surface of the earth from the well tool. To this end, and in accordance with one feature of the present invention, the well tool includes suitable gain adjustment means in the received energy, signal pulse channel which can be adjusted from the earth's surface.

The sync and reflected energy signal pulses are processed at the surface of the earth, in accordance with other features of the present invention, by a signal normalizing means which is responsive to the amplitude level of only a sync pulse to adjust the amplitude level of the sync and signal pulses until the amplitude level of the output sync pulses from the signal normalizing means is substantially equal to a reference amplitude level. The normalized sync and signal pulses are then applied to a detector means which operates to detect and separate the sync and signal pulses. To this end, a plurality of logic circuits operate to insure that the sync and signal pulses appear in substantially the right time relationship to one another and only one signal pulse can be detected per sync pulse, and vice versa. In any event, the detector circuit recurrently generates three pulses, i.e., a gated signal pulse (i.e., a gate is opened at the proper time to pass only the signal pulse), and two timing pulses, designated $T_o$ and $T_x$, representative of the time of occurrence of the sync and signal pulses respectively.

In accordance with an important feature of the present invention, the gated signal pulses are then passed to a lithology circuit which operates to measure variations in the peak amplitude with depth. This peak measurement gives information regarding the formation lithology and is desirably recorded as a function of well bore depth.

In accordance with other features of the present invention, the gated signal pulses are also passed to suitable picture adjustment circuits for further processing and then recorded by a recording means to produce a picture of the well bore wall. The recording means can take the form of a record medium which is moved in correlation with the movement of the well tool, and means for producing a radiant energy beam and modulating the beam with suitable representations of the gated signal pulses. The beam is recurrently swept across the record medium in synchronism with the rotation of the directional transducer means to thereby produce a picture image of the well bore wall (including the wall of a cased well bore, if desired).

The picture adjustment means desirably comprises, in one form, a contrast control means which operates to pass only that portion of each gated signal pulse which is greater than a selected threshold level. This threshold level is desirably a selected percentage of the peak amplitude of the signal pulses to vary the contrast reference as a function of signal changes. By so doing, the picture contrast can be maintained substantially constant regardless of signal level.

Additionally, the picture adjustment circuitry desirably includes circuitry for stretching the signal pulses before recording to enable a smooth continuous picture to be reproduced by the recording means. To this end, each signal pulse causes a control pulse to be generated having an on-time period nearly as long as the time between successive signal pulses. The peak voltage of each signal pulse is measured and stored by a sample and hold means. The sample and hold means is recurrently reset by the off state of the control pulse to enable recurrent updating of the stored peak voltage.

This stored peak voltage is then sent to the recording means to modulate the intensity of the radiant energy beam. By so doing, the resulting picture will be smooth and continuous instead of taking the form of a plurality of density modulated dots.

In another form of the present invention, the stored peak voltage is also compared with a reference voltage and the difference therebetween used to adjust the amplitude of the signal pulses before they are applied to the sample and hold means. The difference signal is filtered or smoothed out so that, on the average, the peak voltage of the signal pulses which are applied to the sample and hold means will be substantially equal to the reference voltage. By utilization of this automatic gain control circuitry, the peak picture brightness, on the average, will remain substantially constant yet relatively instantaneous changes will show up on the picture.

Moreover, if desired, a selected fraction of the amplitude of the control pulse can be combined with the stored voltage from the sample and hold means before application to the recording means. By so doing, a selected degree of brightness can be added to or substracted from the degree of brightness automatically set into the picture by the automatic gain control circuit.

To enable the positioning of the well tool to be determined, the well tool desirably includes deviation and relative bearing measuring devices for generating signals representative of the deviation of the well tool from the true vertical or gravitational axis and the angular bearing of the axis of maximum inclination (axis along which the well tool is leaning) from a fixed well tool reference axis. Moreover, the well tool includes fixed field and earth's field magnetometers for generating orientation signals.

In accordance with the tool orientation features of the present invention, the well tool includes a magnetic field generating means (e.g., a magnet) mounted on the rotating shaft so as to produce a directional, fixed strength magnetic field which rotates as the shaft rotates. A magnetic field detecting means is supported by the support member and responsive to the rotating, fixed strength magnetic field for producing an output signal representative of the angular orientation of a reference axis of the rotating shaft relative to a reference axis of the support member. Thus, this output signal is representative of the orientation of the rotating transducer relative to the support member reference axis. An earth's field detecting means is rotated in synchronism with the fixed field generating means and is directionally responsive to the earth's natural magnetic field for producing an output signal representative of the strength of the earth's field at a plurality of angular orientations of the earth's field detecting means. By so doing, a pair of substantially sinusoidal shaped signals will be produced from both detecting means with the phasing of the signal produced by the fixed strength field detecting means indicating the orientation of the rotating fixed field generating means relative to the support member. Likewise, the phasing of the signal produced by the earth's field detecting means will be indicative of the orientation of the rotating earth's field detecting means relative to the earth's magnetic field, e.g., relative to magnetic north.

Since these devices rotate in synchronism with one another, the azimuth of the well tool can be determined by comparing the phasing of the two orientation output signals. Moreover, by rotating these orientation devices in synchronism with the directional transducer, one or the other of these orientation signals can be used to synchronize the sweep of the radiant energy beam across the record medium with the rotation of the transducer.

In accordance with still another feature of the present invention, the $T_o$ and $T_x$ timing pulses, discussed earlier, can be utilized to determine the average, maximum, and minimum well bore diameter. To this end, the time separation between the $T_o$ and $T_x$ pulses is converted to a voltage signal proportional to this time separation. This voltage signal can then be filtered and recorded to produce an average diameter measurement. Moreover, one or both of the maximum or minimum diameters can be determined by measuring the maximum and/or minimum amplitude level for each 360° scan of the rotating transducer.

Moreover, in accordance with another feature of the present invention, the authenticity of the diameter measurements can be determined by checking to see if there is a $T_x$ pulse for every $T_o$ pulse. If a plurality of $T_x$ pulses are missing, the diameter measurements can be selectively rejected.

In accordance with yet another feature of the present invention, the sync and signal pulses can be visually displayed as, for example, by an oscilloscope. To this end, each sync pulse is delayed a time interval which is almost, but not quite, as long as the time interval between successive sync pulses. These delayed synch pulses are then used to generate a sawtooth wave voltage for application to the horizontal deflection input of the oscilloscope and the sync and signal pulses are applied to the vertical deflection input of the oscilloscope. By so doing, the oscilloscope sweep is initiated just prior to the arrival of each $T_o$ pulse to enable the display of both the sync and signal pulses.

For a better understanding of the present invention, together with other and further objects thereof, reference is had to the following description taken in connection with the accompanying drawings, the scope of the invention being pointed out in the appended claims.

Referring to the drawings:

FIGS. 2A and 2B show the FIG. 1 apparatus in greater detail;

FIGS. 6A–6G are waveform displays of the signals generated by some of the downhole circuitry of the FIG. 2B apparatus;

FIGS. 7A–7F illustrate waveform displays of the signals occurring at various points in the FIGS. 2A–2B electronic circuits;

FIG. 8 is a plot of the acoustic energy received by the well tool versus time to illustrate certain features of the present invention;

FIG. 9 illustrates certain portions of the FIG. 2A surface electronics in greater detail;

FIGS. 10A-10P and 11A-11E show waveform displays of the signals occurring at various points in the FIG. 9 electronic circuitry;

FIGS. 13A-13H illustrate waveform displays of the signals found at various points in the electronic circuits of FIG. 12.

Figure 1:
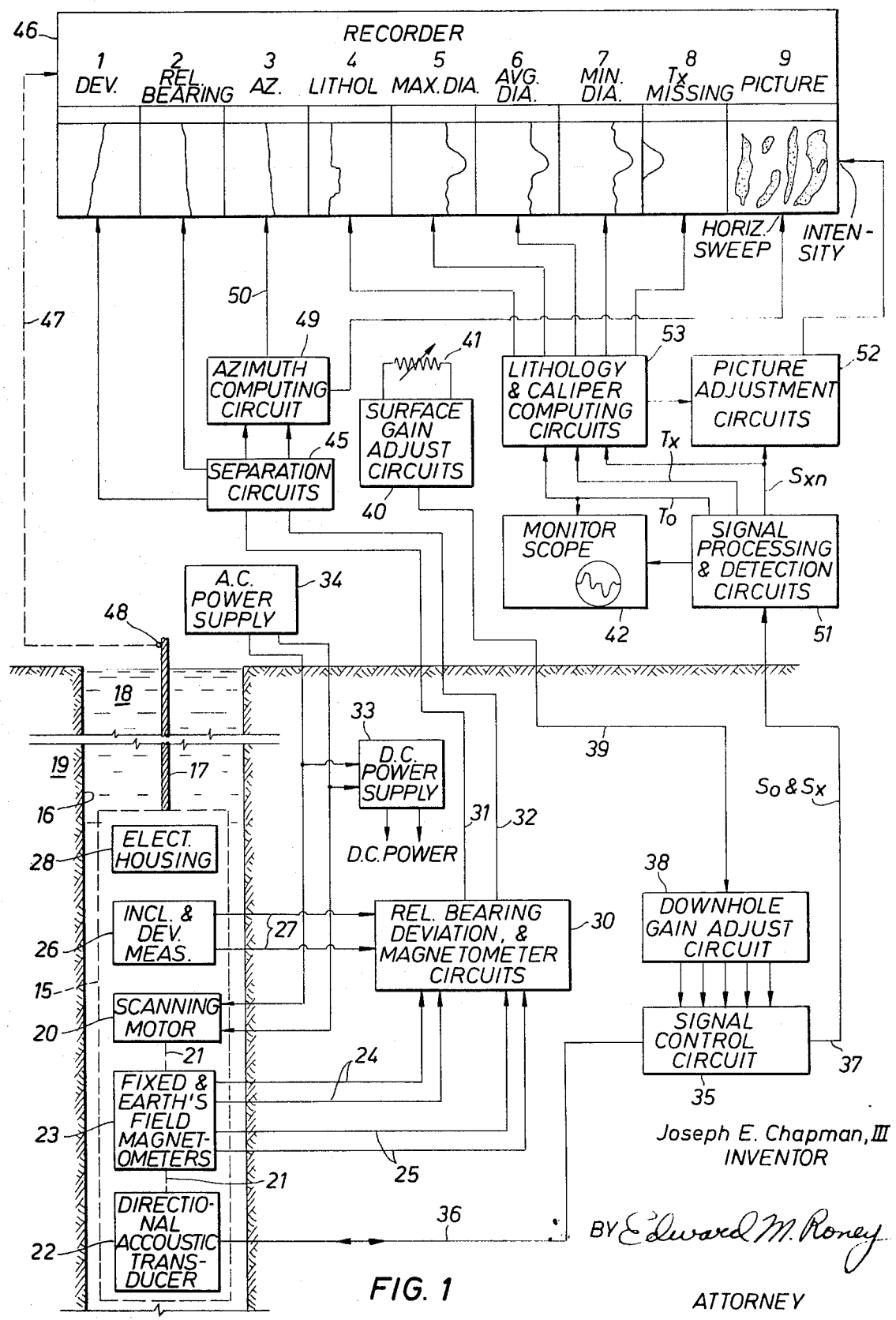
FIG. 1 shows a well tool in a borehole along with a schematic representation of apparatus arranged in accordance with the present invention.

Referring now to FIG. 1, a well tool 15 is schematically illustrated as disposed in well bore 16 on the end of an armored multiconductor cable 17. Well bore 16 which can be cased or open hole contains a control liquid or a drilling mud 18 and traverses earth formations 19. The cable 17 is spooled on a suitable drum and winch mechanism (not shown).

The well tool 15 includes an electrical scanning motor 20 which drives a shaft 21 at a constant rotational speed to rotate directional acoustic transducer 22 and a magnetometer 23. A single transducer 22 directionally emits and receives acoustic energy as it is rotated, the received acoustic energy primarily being reflected from the wall of the well bore 16. The transducer is repetitively energized during a single rotation to obtain measurements from a plurality of circumferential locations on the borehole wall.

The rotating magnetometer 23 is fixed relative to transducer 22 to provide information as to the aximuth location of the directional acoustic transducer 22. Magnetometer assembly 23 is responsive to the earth's magnetic field for producing an output signal representative of the intensity of the earth's magnetic field along a horizontal axis which is correlated with the direction in which acoustic energy is being emitted and received by the transducer 22. The magnetometer assembly 23 also provides an output signal representative of the orientation of the transducer 22 relative to a fixed point or axial location on the well tool 15.

The well tool 15 also includes an inclination and deviation measuring device 26 which operates to measure the inclination and deviation of the well tool.

With the above described tool, measurements are made and recorded as a function of depth of the:
  a. deviation of the tool relative to a gravitational axis;
  b. an azimuth bearing;
  c. relative bearing of the tool, i.e., the angle between the azimuth bearing and a reference point on the tool;
  d. lithology, i.e., an indication in open holes of the type or kind of formation;
  e. maximum, minimum and average diameter of the well bore as well as presence of a signal ($T_x$) to indicate reliability of the diameter measurements; and
  f. a pictorial presentation of the surface characteristics of the wall of the well bore.

As will be clear from the description to follow, certain of the above measurments are of particular interest only to open holes while other measurments are of particular interest in cased holes. The tool nonetheless records the parameters irrespective of whether the bore is cased or open.

In the tool 15, while not shown, the electronic components are protected by conventional fluid or liquid tight housings against the effects of liquid and pressure. A surface located AC power supply 34 supplies AC power for the scanning motor 20 as well as for a DC power supply located in the tool. The relative bearing and deviation measurment system 26 is conventional and, for example, can be similar to that illustrated in U.S. Pat. No. 2,746,162 granted to M. F. B. Picard on May 22, 1956. In this system, varying DC signals are developed which are representative of the relative bearing and deviation of the tool. These DC signals are supplied via conductors 27 (ground returns not shown) to a deviation and magnetometer circuit 30 for transmission to the surface located panel.

Circuit 30 also receives the outputs of the magnetometer system 23 which provides respectively, via conductors 24, AC signals derived relative to the earth's magnetic field and, via conductors 25, AC signals derived to indicate a relative orientation of the tool in a well bore. The magnetometers as well as a single, directional transducer are rotated by the shaft 21 driven by the scanning motor 20 which has a constant rotational speed.

The mixed signals comprising two AC signals and two DC signals are transmitted via cable conductors 31, 32 to a surface located separation circuit 45 for separation of the DC deviation signals and DC relative bearing signals to supply them to a recorder 46 which provides a deviation and relative bearing record as a function of depth. The separated AC signals related to the earth's magnetic field and the relative tool position are supplied to an azimuth computing circuit 49 which provides an azimuth computation to the recorder 46 as a function of depth. The record, as a function of depth, is made by correlating the speed of the recording medium to cable travel by means of a mechanical coupling to a cable driven sheeve 48. The azimuth computing circuit 49 also supplies a sync signal to the sweep control of an oscilloscope in the recorder to initiate a sweep for each revolution of the transducer where the initiation of the sweep is coordinated with an azimuth.

The transducer 22 is operated at a fixed frequency rate during each revolution to emit energy and detect energy reflected from the wall of a well bore. A common channel 36 couples the transducer 22 to a signal control circuit 35. Circuit 35 provides a number of functions including repetitive actuation pulses for energizing the transducer and a receiver channel for processing reflected energy. With each transducer actuation pulse, an indicator signal $S_o$ is supplied to the cable channel 37. During the time period of the transducer actuation pulse the receiver channel is disabled. Following this period the receiver channel is enabled so that a signal $S_x$ representative of reflected energy at the transducer can be transmitted via cable channel 37 to the surface. In the receiver channel is a gain control circuit which is controlled by a downhole gain adjust circuit 38 to provide a monitored control of the amplitude characteristics of the $S_x$ signals. At the earth's surface, gain adjust circuits 40 are coupled via a cable channel 39 to the downhole gain adjust circuit 38. A variable resistor 41 connected to circuit 40 changes the code control signals provided by circuit 40 to the downhole circuit 38.

The $S_o$ and $S_x$ pulses on cable channel 37 are related to the time of actuation of the transducer and the time at which the transducer is actuated by energy reflected from the well bore wall. Thus, the time difference is easily related to either the radius or diameter of the well bore. In the present case, the measurement described will be the diameter. By multiple sampling during each revolution, many diameter determinations are made. In the present invention, during each revolution of the transducer the minimum diameter measurement, the maximum diameter measurement and the average diameter measurement are obtained and recorded by means of surface located signal processing and detection circuits 51 as well as lithology and caliper computing circuits 53. The above-mentioned diameter measurements are recorded on recorder channels 5–7 as a function of depth.

The lithology curve as represented in channel 4 of the recorder 46 is obtained from an anlysis of each peak of successive signals representaing reflected energy during each revolution of the transducer. The maximum peak amplitude is selected from the number of successive signals during a revolution as representative of the lithology of the formation under investigation.

The single maximum peak amplitude is indicative of lithology for the following reasons. Emitted acoustic energy from the transducer can only be reflected back to the transducer if there is an acoustic impedance mismatch between the transmitting medium (liquid in the well bore) and the formation. The amount of reflected energy is a function of the relative acoustic impedance mismatch. Since the amount of emitted energy could be determined as well as the attenuation characteristics of the liquid transmission media, the amount of reflected energy is in direct relationship to the acoustic impedance of the formation. The well bore wall is, however, not necessarily smooth or perpendicular to the directed emission of acoustic energy. If the wall is smooth and perpendicular, the maximum amount of reflected energy arrives at the transducer whereas a contrary wall condition will cause less than the maximum amount of relfected energy to be detected. By selecting a single maximum peak amplitude during a revolution, the chances are optimized to obtain a representative signal of maximum reflected energy. In FIG. 8, an illustration is made to show that recording of peak amplitudes during each revolution gives a sharp presentation contrast which can indicate a change of lithology. Average amplitude measurement obtained during a revolution, on the other hand, do not accurately define the lithology.

In the signal processing and detection circuits 51, the $S_o$ and $S_x$ pulses are normalized in response to the signal strength of the $S_o$ pulses. The strength of the $S_o$ signal which is a predetermined amount is used as a reference to determine the change in gain necessary to compensate for factors which tend to affect the amplitude of the received signal.

In line with common terminology, the time of a first significant arrival of the $S_o$ and $S_x$ pulses are respectively referred to as $T_o$ and $T_x$ pulses at the surface while the normalized $S_x$ pulse at the surface is referred to as a $S_{xn}$ pulse.

Circuits 51 provide signals to a monitor scope 42 to provide a ready visual display of the signals as received. Signals from circuits 51 and 53 are also provided to a picture adjustment circuit 52 which, in turn, controls the contrast and brightness of the scope picture in the recorder to control the appearance on the recording medium.

Figure 2A:
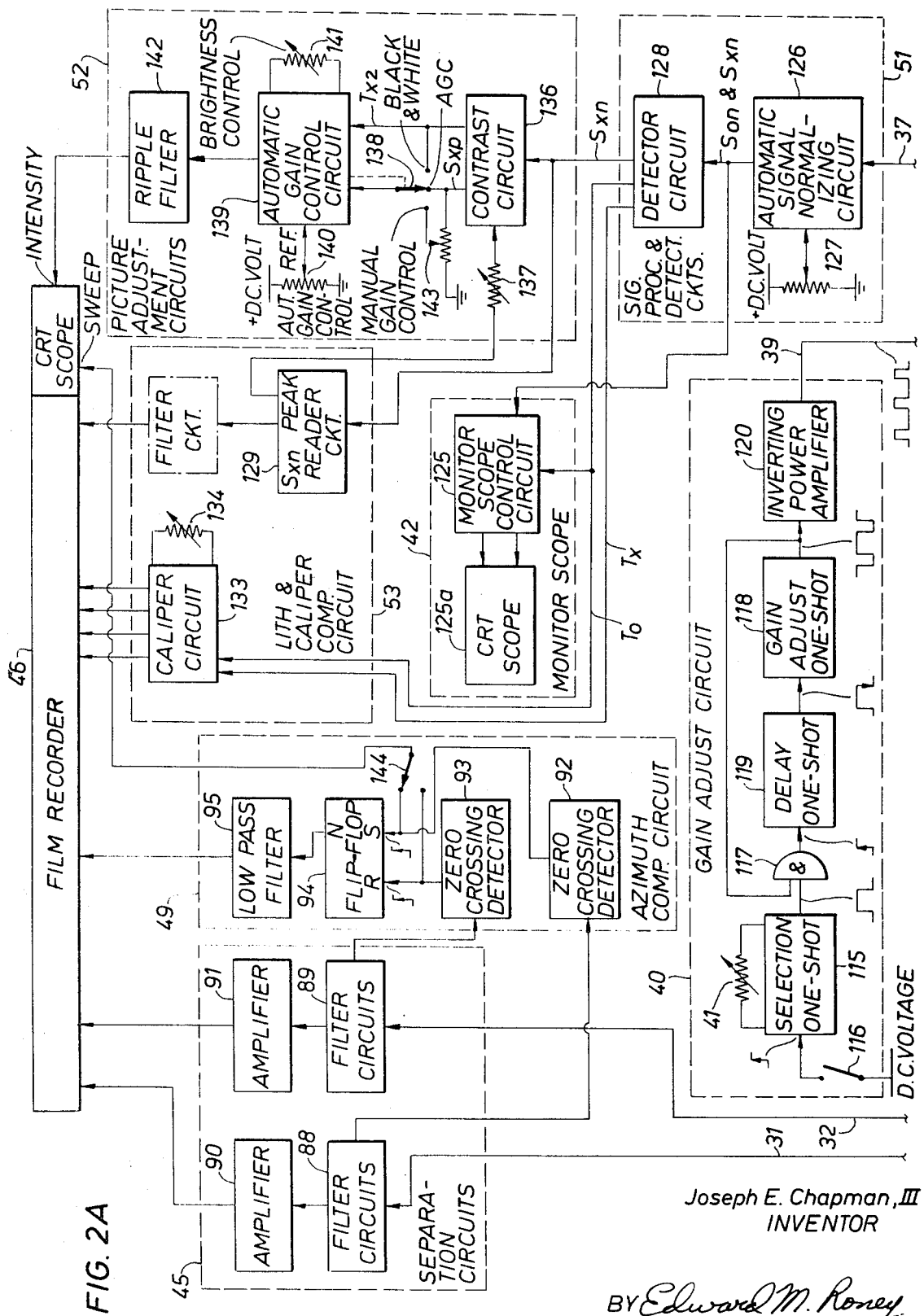

Now referring to FIGS. 2A and 2B, the apparatus of FIG. 1 is shown in greater detail where FIG. 2A shows the surface apparatus and FIG. 2B the downhole apparatus. In FIG. 2B, the scanning motor 20 is mounted in a housing or support member 65 by a plurality of inserts or ribs 67.

Two magnetometers are provided, an earth's field magnetometer 23a which provides a signal related to the azimuth of the directional transducer 22 and fixed field magnetometer 23b which provides a signal relative to the orientation of the transducer relation to a fixed point on a tool.

The earth's field magnetometer 23a is comprised of a pair of sectorial members 60 and 61 made of a suitable magnetic material and mounted at longitudinally spaced positions on a magnetic portion 21a of the shaft 21. In FIG. 2B, the members 60 and 61 are shown in perspective rather than in true cross section for ease of illustration. These sectorial members are preferably semicircular with the respective edge surfaces 60a and 61a arranged to face in opposing directions. A coil 62 is wound around a nonmagnetic spool shaped core 62a supported by the support member 65 and encircles the magnetic shaft portion 21a at a location intermediate of the sectorial members 60 and 61. The coil 62 is responsive to changes in flux passing through the magnetic shaft portion 21a for developing a characteristic electrical signal. Preferably, a semicircular shaped sectorial member of nonmagnetic material (not shown) will be attached to each of the magnetic sectorial members 60 and 61 to provide disc shaped members. By so doing, dynamic balancing of the entire disc assembly can be obtained.

In operation, the magnitude of magnetic flux passing through the sectorial members 60 and 61 and magnetic shaft portion 21a will be substantially proportional to the area of each of these members which is normal to the direction of the earth's magnetic field. Thus, if the earth's magnetic field is oriented in the direction represented by the vector X in FIG. 2B, the magnetic flux passing through the members 60 and 61 will be at a maximum, and when oriented in a direction represented by the vector Y, it will be zero. When the members 60 and 61 are rotated by one complete revolution from that position shown in FIG. 2B, this magnetic flux will be at a maximum value of the opposite polarity.

Figure 5A:
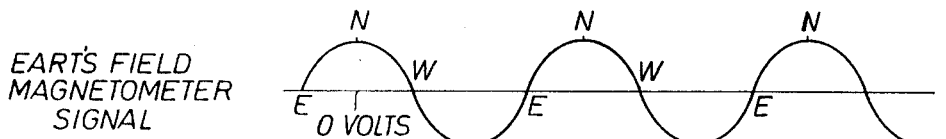
FIGS. 5A–5E illustrate waveform displays of various signals produced by the circuitry of FIGS. 2A and 2B.
Figure 5B:

If the area of the sectorial members which is normal to the earth's magnetic field were calculated for all angular positions, it would be found that there is a sinusoidal variation of the area versus angular position. (However, due to field distortion at the edges of the members 60 and 61, the flux magnitude will not vary in a completely sinusoidal manner.) This change in flux through the shaft portion 21a will induce a voltage in the coil 62 to thus provide an electrical signal whose phasing is representative of the azimuth orientation of the directional transducer 22 at all times. An example of this signal, along with azimuth designations, is shown in FIG. 5A. This signal is supplied via conductors 25 to an amplifier 86 in the circuit assembly 30.

In the fixed field magnetometer 23b, the shaft 21 has an enlarged portion 21b made of a suitable nonmagnetic material. A cylindrical magnet assembly 63 is disposed in a centrally located perpendicular bore in shaft portion 21b. Cylindrical magnet assembly 63 includes a permanent magnet 63a and two abutting pieces of magnetic material 63b located on either side of the magnet 63a. (See FIG. 3) The north and south poles of the magnet 63a abut the cylindrical magnetic pieces 63b. The outer or end faces of these magnetic elements 63b are flush with the outer face of the enlarged portion 21b of the shaft 21. The cylindrical member 63 is suitably bonded to the enlarged shaft portion 21b for mechanical strength of the entire shaft assembly.

Figure 3:
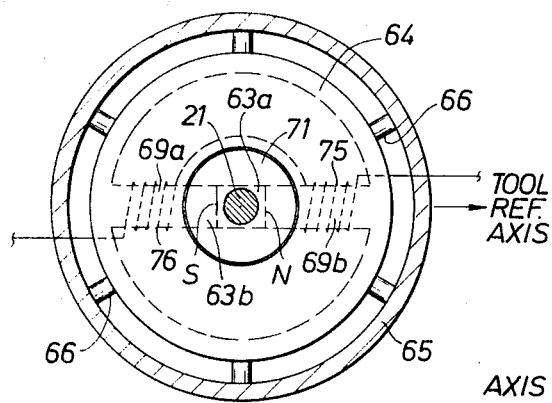
FIG. 3 is a section view of a portion of the apparatus of FIG. 2B.

As shown in FIGS. 2B and 3 a shell or casing 64 made of a magnetic material is concentrically disposed around the enlarged portion 21b of the shaft 21. A plurality of nonconductive, non-magnetic inserts 66 attached the shell 64 to the longitudinal support member 65. The upper and lower portions 68 and 70 of the shell 64 have circular openings. A pair of annular magnetic members 71 and 72 are respectively disposed in the top and bottom openings of the shell 64 and abut the outer faces of the enlarged shaft portion 21b on either end. Suitable retaining pins 73 and 74 secure magnetic members 71 and 72 to the shaft 21.

The shell 64 also has a pair of inwardly extending cylindrical projections 69a and 69b (with axes disposed normal to the axis of the tool) disposed adjacent the cylindrical magnetic members 63b so that magnetic flux produced by the magnet 63a will be coupled via the magnetic member 63b to the cylindrical projection 69a on one side of the shell 64 and return circumferentially around the shell 64 to the cylindrical projection 69b on the other side thereof. The magnetic annular pieces 71 and 72 serve to reduce the air gap in the magnetic path extending around the shell 64. To insure that the spacing between the enlarged shaft portion 21b and the annular magnetic shell 64 is constant, suitable bearing supports (not shown) are provided above and below the shell 64 for maintaining the shaft 21 always centrally disposed relative to the longitudinal extending support member 65.

From the foregoing, it can be seen that as the shaft 21 rotates, the magnitude of flux passing through the central cylindrical projections 69a and 69b will be indicative of the angular position of the shaft 21 relative to a reference axis on the longitudinally extending support member 65. To provide an electrical signal representative of this angular position, a pair of coils 75 and 76 are wound around a nonmagnetic core 78 so as to encircle the longitudinally extending magnetic members 69a and 69b. This non-magnetic core 78 (FIG. 2B) forms a shell inside the magnetic shell 64 and encircles the enlarged shaft portion 21b and cylindrical projections 69a and 69b.

Figure 5C:
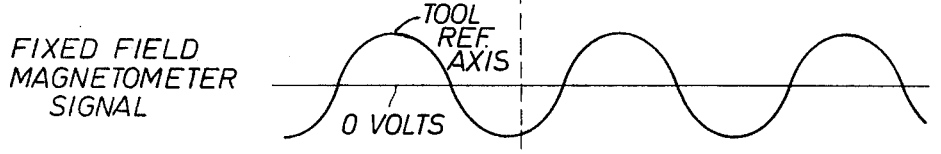

From the foregoing, it can be seen that the cylindrical magnet assembly 63 comprises a magnetic field generating means, and the cylndrical projections 69a and 69b and the associated return magnetic path through the shell 64, and coils 75 and 76 comprise a magnetic field detecting means. When the magnetic field generating means is aligned with the magnetic field detecting means, i.e., the cylindrical projections 69a and 69b are aligned with the cylindrical magnet assembly 63, the magnetic flux passing through the projections 69a and 69b will be at a maximum value of one polarity and when the magnetic field generating and detecting means are 90° apart (perpendicular to one another), this magnetic flux will be approximately nonexistent. Referring to FIG. 5C, there is shown a waveform display of the electrical signal produced by the coils 75 and 76. This signal will essentially take the form of a sine wave whose phasing is representative of the angular position of the cylindrical magnetic field generating means 63 in the enlarged shaft portion 21b relative to the angular position of the magnetic field detecting means (cylindrical projections 69a and 69b) as a function of time.

Since the directional transducer 22 is attached to shaft 21, it can be seen that the earth's field magnetometer 23a will produce a signal which is representative of the angular direction of the directional acoustic transducer 22 relative to a fixed azimuth reference and the fixed field magnetometer 23b will provide a signal representative of the orientation of the directional transducer 22 relative to a fixed longitudinal axis on the longitudinal support member 65. By comparing the fixed field signal with the earth's field signal, the azimuth orientation of the fixed reference axis of the longitudinal support member 65 can be accurately determined. This comparsion operation is performed by the azimuth computing circuits 49 at the surface of the earth.

To transmit the relative bearing, deviation and field measurements to the surface of the earth, the relative bearing measurement from the measuring unit 26, which measurement is in the form of a varying DC signal, is passed to the surface of the earth over the conductor 31 by way of the secondary winding 80 of a transformer 81. The fixed field magnetometer signal from the windings 75 and 76 are applied via amplifier 82 and transformer 81 to cable channel 31. The deviation and earth's field magnetometer signals are supplied to the surface of the earth in a similar manner with the deviation measurement (also in the form of a DC signal) being supplied over the conductor 32 by way of the secondary winding 84 of a transformer 85. The earth's field coil 62 couples the earth's field magnetometer signal via amplifier 86 and transformer 85 to cable conductor 31.

Figure 5D:
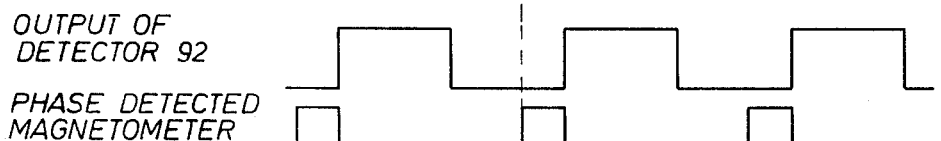

At the surface of the earth, the deviation, relative bearing and magnetometer signals are first applied to the separation circuits 45 which include suitable filter circuits 88 and 89 for separating the DC components from the AC components and thus separating the deviation and relative bearing DC measurements from the magnetometer AC measurements. The deviation and relative bearing signals from filter circuits 88 and 89 are respectively supplied to amplifiers 90 and 91 for application to the recorder 46 to provide indications of the deviation and relative bearing of the well tool 15. The AC signals from filter circuits 88 and 89, on the other hand, are respectively applied to zero crossing detectors 92 and 93 which operate to produce output signals having sharp amplitude changes whenever the magnetometer signals cross zero volts. Thus, referring to FIGS. 5A–5D, FIG. 5B shows the square wave output signal from the zero crossing detector 93 in response to the earth's field magnetometer signal of FIG. 5A and the square wave of FIG. 5D represents the output signal from zero crossing detector 92 in response to the fixed field magnetometer signal of FIG. 5C.

Figure 5E:
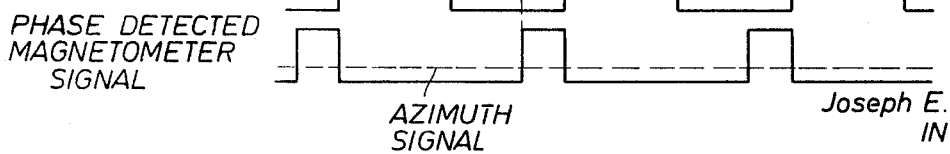

The rising edges of the output signals from zero crossing detectors 92 and 93 energize the reset and set inputs, respectively, of a flip-flop circuit 94. The normal output of the flip-flop 94, which is shown in FIG. 5E, will have an on-time or duty cycle proportional to the phase difference between the zero crossing of the earth's field magnetometer signal and the zero crossing of the fixed field magnetometer signal, and thus equal to the phase difference between these two signals. Thus, since the earth's field magnetometer signal will cross zero in a positive direction at some known azimuth (east or west depending on whether the shaft 21 is being rotated clockwise or counterclockwise) and the fixed field magnetometer signal will cross zero in a positive direction when the fixed reference point on the shaft 21 (i.e., the direction of the directional acoustic transducer 22) is aligned with a fixed reference point on the support member 65, it is clear that the on-time or duty cycle of the FIG. 5E waveform will be proportional to the angular difference between the direction of the fixed reference point on the support member 65 and the selected azimuth. Thus, this duty cycle is proportional to the azimuth orientation of the support member 65, and to the well tool 15.

To provide a DC signal proportional to the azimuth orientation of the well tool 15, the normal output of the flip-flop 94 is supplied to a low-pass filter 95 which operates to provide a DC signal proportional to the on-time or duty cycle of the output signal from flip-flop 94. This filtered output signal from filter 95 is represented as the dotted line waveform in FIG. 5E and is supplied to the recorder 46 to provide an indication of the azimuth orientation of the well tool 15.

Figure 4:
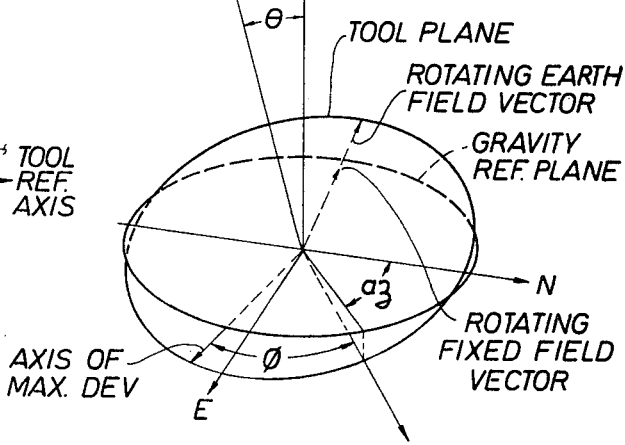
FIG. 4 is a three axis vector diagram to illustrate the operation of certain portions of the apparatus of FIGS. 2A and 2B.

To better understand what azimuth, relative bearing and deviation measurements pertain to, FIG. 4 illustrates a three dimensional diagram of axis relationships in space. A plane, taken normal to the axis Z, of the tool is a circular section and can be tilted an angle $\theta$ relative to gravity reference plane having a perpendicular gravity vector G. On the gravity reference plane, the "tool reference axis" and an "axis of maximum deviation" (an axis defining the azimuthal direction which the tool is tilting) are shown on the tool plane.

The deviation signal derived from the deviation measuring device 26 is proportional to the angle $\theta$ between the Z and G axes, i.e., the deviation of the tool from true vertical. The relative bearing signal derived from the relative bearing measuring device 26 is proportional to the angle $\phi$ between the tool reference axis and axis of maximum deviation.

The azimuth signal from azimuth computing circuit 49 gives a measure of the azimuth orientation of the tool in the following manner. Shaft 21 rotates the segmented elements 60 and 61 of the earth's field magnetometer 23a and the cylindrical magnet assembly 63 of the fixed field magnetometer 23b and this can be considered tantamount to rotating a pair of vectors about the Z axis of the tool plane of FIG. 4. Both of these imaginary rotating vectors, or phasors, are shown in dotted line in FIG. 4.

Relative to operation of the earth's field magnetometer, the length of an imaginary rotating vector will be zero when the vector is pointing east or west, a maximum of one polarity when it is pointing north and a maximum of the opposite polarity in the southerly direction. The fixed field vector, on the other hand, will be a maximum of one polarity when aligned with the tool refernce axis (From FIG. 3, remember that the magnetic field detecting means is considered to be aligned with the tool reference axis), a maximum of the opposite polarity when rotated 180° away from this axis, and zero when perpendicular to this tool reference axis. (Note that the relation of polarity to direction depends on the polarity of winding direction of coils 75 and 76). If the lengths of these vectors as a function of angular orientation were plotted, waveforms of FIGS. 5A and 5C would result.

Since shaft 21 effectively causes the rotation of these vectors, both vectors will rotate concurrently and thus the phase difference between the resulting signals will give the relative orientation of the tool reference axis to an azimuthal reference axis. Thus, the phase difference between the two signals when both are at a maximum amplitude level of the same polarity will give the angular difference between magnetic north and the tool reference axis. To simplify the electronics, the angular difference between the "east" axis and an axis perpendicular to the tool reference axis is measured to enable the use of zero crossing detectors, but the same result is attained. Then, to find the orientation of the axis of maximum deviation relative to magnetic north, it is only necessary to algebraically add the relative bearing measurement to the azimuth measurement.

The signal control circuit 35 as shown in detail in FIG. 2B is coupled to the directional transducer 22 via the conductor 36. In the control circuit 35 is an asymmetrical abstable multivibrator 100 which regulates the actuation of the transducer 22 and provides a time of actuation signal as well as inhibiting the receiver channel during the transmitter actuation period. Multivibrator 100 generates an output signal waveform as illustrated in FIG. 6A, for energizing a transmitter firing circuit 101 and triggering a $t_o$ one-shot circuit 102. The rising edges of the output signal from the multivibrator 100 are used to energize the one-shot circuit 102 which generates a sharp spike pulse as shown in FIG. 6D, to provide an indication of each time the transducer 22 is energized. The sharp spike pulses are applied to a cable driving circuit 103 which provides shaped output pulses $s_o$ (shown in FIG. 6G) to the cable conductor 37.

Transmitter firing circuit 101 is energized by the lagging or falling edges of the positive pulse portions of the multivibrator signal and energizes the directional transducer 22 by way of an energy coupling assembly (not shown) which is described in copending application Ser. No. 765,869 by Virgil H. Adams filed on Oct. 8, 1968, and now abandoned. The resulting transmitter firing signal is shown in FIG. 6B and causes the acoustic transducer 22 to emit a burst of high frequency acoustic energy through an annular acoustically transparent window 22a into the media surrounding the well tool 15. The emitted acoustic energy propagates toward the well bore wall and a significant portion of the emitted acoustic energy is reflected back from the well bore wall if the characteristic acoustic impedance of the liquid in the well bore is different from the adjoining formation or media. Reflectd acoustic energy from the well bore wall may be detected by the emitting transducer 22 or by an independent transducer. In any event, a received signal is illustrated in FIG. 6C.

The receiver channel of the signal control circuit 35 includes a limiter circuit 104, an enable gate 105, a gain set circuit 106, an amplifier 107, a second enable gate 108, and a rectifier or demodulator circuit 109. The limiter circuit 104 has its amplitude cutoff level set at a level above the maximum expected amplitude of the received signal but low enough to prevent saturation of or damage to the remainder of the receiver circuits by the high energy transmitter firing signals. Enable gates 105 and 108 are normally de-energized. To energize enable gates 105 and 108, the trailing edge of the positive portion of the multivibrator signal (FIG. 6A) from the multivibrator 100 energize a "gate delay one-shot" circuit 110 which produces an output signal as shown in in FIG. 6E. The trailing edge of the delay pulse (FIG. 6E) energizes a "gate one-shot" 111 whose output waveform is shown in FIG. 6F. The "gate one-shot" 111 then operates to energize the enable gates 105 and 108 of the receiver channel. By inspection of the voltage timing diagrams of FIGS. 6A–6G, it can be seen that the enable gates 105 and 108 will be de-energized for a period of time sufficient to encompass the duration of the transmitter firing signal and then will be energized or opened to allow the received signal of FIG. 6C to pass through the receiver channel. As mentioned heretofore, the limiter circuit 104 operates to chop off a substantial portion of the transmitter firing signal. The gain set circuit 106 can be adjusted in a manner to be explained later. The rectifier circuit 109 demodulates the received signal of FIG. 6C and applies the signal to circuit 103 which produces the signal pulse $S_x$ of FIG. 6G. This signal pulse $S_x$ is then transmitted to the surface of the earth.

In the surface panel are circuits to obtain measurements of lithology, diameter and a pictorial representation of the well bore wall. The following generalized description with respect to FIG. 2A will be followed by a detailed description of specific circuitry illustrated in FIG. 9 which will accomplish the following described functions. The $S_o$ and $S_x$ pulses generated from the signal control circuit 35, are applied to the input of an automatic signal normalizing circuit 126 (FIG. 2A) which utilizes the amplitude of the $S_o$ pulses for adjusting the gain of the automatic signal normalizing circuit 126. Details of circuit 126 will be explained later with respect to FIG. 9. The reason for selecting the $S_o$ pulses is that the amplitude of the $S_o$ pulses have a reasonably constant value while the $S_x$ signals, of course, vary in proportion to the conditions of the media surrounding the well tool 15. The amplitude of the $S_o$ pulses is compared with a reference voltage determined by a potentiometer 127 so that the $S_o$ pulses generated from the automatic normalizing circuit 126 are always constant at this reference value. By so doing, the $S_x$ pulses will also be normalized so that factors which tend to upset the accuracy of the system, such as cable attentuation will tend to be compensated for.

The normalized $S_o$ and $S_x$ pulses, designated $S_{on}$ and $S_{xn}$ respectively, are applied to a detector circuit 128 and a monitor scope 42. Detector circuit 128 accurately detects and separates the $S_{xn}$ pulses from the $S_{on}$ pulses for application to other circuits for further processing and subsequent use in producing the picture of the well bore wall. The detector circuit 128 additionally generates shaped timing pulses, designated $T_o$ and $T_x$, which are representative of the time of arrival of the $S_o$ and $S_x$ pulses and are utilized by the caliper circuit portion of the lithology and caliper circuits for computing the well bore or casing diameter. Additionally, the $T_o$ pulses are used by the monitor scope 42 for purposes to be explained later.

The normalized signal pulses $S_{xn}$ are applied to a peak reader circuit 129 within the lithology and caliper computing circuits 53. The peak reader circuit 129 then proceeds to measure the peak amplitude of these $S_{xn}$ pulses and generate a DC signal proportional thereto. Desirably, the peak reader circuit 129 has a relatively fast charging rate and a slow discharge rate to accomplish this function. This charging rate should, however, be slow enough that an occasional noise pulse will not unduly upset the operation by charging this circuit to a high voltage level. Preferably the charging time constant will be such as to allow the peak reader to charge to a new value after four or five $S_{xn}$ pulses have been sampled. The output signal from the peak reader circuit 129 is then applied to recorder 46 via a filter circuit to provide a measurement of the lithology of the formations 17 adjoining the borehole 16.

With respect to the caliper computing operation, both the $T_o$ and $T_x$ timing pulses to are applied to a caliper circuit 133. The caliper circuit 133 operates to measure the time interval between the $T_o$ and $T_x$ timing pulses to produce the maximum, minimum and average well bore diameter readings for application to channels 5, 6, and 7 of the recorder 46 as discussed in connection with FIG. 1. Since the velocity characteristic of the liquid will be a factor in the time difference between the $T_o$ and $T_x$ pulses, a variable resistor 134 is provided for adjusting an operating characteristic of the circuit 133 so that the output diameter signals can be recorded with the desired accuracy.

The picture adjustment circuits 52 receive the normalized reflected energy signal pulses $S_{xn}$ which are applied to a contrast circuit 136. Circuit 136 passes only that portion of each pulse $S_{xn}$ which is above a selected threshold amplitude level. To insure that this threshold level is normalized to the amplitude of the $S_{xn}$ pulses, a selected fraction of the peak level output signal from the $S_{xn}$ peak reader circuit 129, after polarity inversion, is applied to the contrast circuit 136 by way of a variable resistor 137 as the threshold voltage. By so doing, the contrast setting becomes a selected fraction of the peak amplitude of the reflected energy pulses $S_{xn}$. Since the peak reader circuit 129 has a relatively fast charging rate and a slow discharge rate, the amplitude of the pulses generated by the contrast circuit 136 will be regulated realtive to the peak amplitude of the $S_{xn}$ pulses. In other words, the picture background level will be continuously adjusted to show a desired amount of picture detail without undue background cluttering, i.e., the greater the picture detail, the higher the contrast threshold level will be set to eliminate background clutter.

It will be appreciated that if the contrast threshold level were fixed, the movement of the well tool 15 from one formation bed to another or a change in well bore diameter would require a completely different contrast threshold setting for the best possible picture. However, by utilizing the peak level of the reflected energy pulses $S_{xn}$, this contrast threshold level is automatically adjusted to take this into account.

The contrast control variable resistor 137 is set at any desired level to select the contrast of the picture displayed by the recorder 46, i.e., the percentage of the peak amplitude that each $S_{xn}$ pulse must have to be passed. Thus, for example, if a section of the well bore having a particularly rugose wall is being investigated, the picture would ordinarily be cluttered with detail. In this event, it may be desirable to adjust the contrast control resistor 137 so that only relatively deep cavities in the well bore wall will show up on the picture. Alternatively, if the well bore wall is very smooth, the contrast should probably be increased so that at least some detail would show up on the picture.

The contrast circuit 136 then produces the picture signal pulses $S_{xp}$ which are applied by way of the AGC (automatic gain control) contact of a triple-throw switch 138 to the input of an automatic gain control circuit 139 which operates to maintain the peak signal strength of the picture pulses, on the average, at a desired level as determined by the reference voltage produced by a potentiometer 140. By so doing, the peak picture brightness, on the average, will remain substantially constant.

The contrast circuit 136 also produces a constant amplitude pulse $T_{x2}$ whenever the reflected or received energy pulse $S_{xn}$ is greater than the contrast threshold level of the contrast control circuit 136. These $T_{x2}$ pules are utilized by the automatic ga control circuit 139 for various control operations to be discussed later and are also applied to the "Black and White" contact of the switch 138 for subsequent application to the CRT scope of the recorder 46. By so doing, the maximum possible picture contrast can be obtained. A third contact of the switch 138, designated "manual gain control" receives the picture signal pulses $S_{xp}$ from the contrast circuit 136 by way of a manual gain adjust potentiometer 143. The switch 138 is mechanically ganged with another triple-throw switch (not shown in FIG. 2A) within the automatic gain control circuit 139 so as to disable the automatic gain control operation when switch 138 is in the manual gain control configuration.

A variable resistor 141, which is connected to the automatic gain control circuit 139, is utilized to adjust the amplitude level of the output signals from the automatic gain control circuit 139 by adding (or subtracting, if desired) a selected bias voltage to these output signals. By so doing, the brightness of the beam impinging on the face of the CRT scope, and thus the picture brightness, can be adjusted. The output signals from the automatic gain control circuit 139 are then applied by way of a smoothing, or low-pass filter 142 to the intensity control input of the cathode ray tube oscilloscope which forms channel 9 of the recorder 46.

To synchronize the sweep of the electron beam across the face of the CRT oscilloscope with the rotation of the rotating transducer 22, a double-throw switch 144 selects the output signal from either one of zero crossing detectors 92 or 93 to trigger the sweep of the CRT scope beam. In other words, the sweep of the CRT scope beam, as determined by the positioning of switch 144, can be synchronized with either an azimuth reference orientation or a well tool reference orientation. In open, uncased holes, the azimuth reference orientation is desirably utilized, and in cased holes, the well tool reference orientation is utilized. (The casing prevents a measure of the earth's magnetic field.)

The $S_{on}$ and $S_{xn}$ output pulses from the automatic signal normalizing circuit 126 are also applied to a monitor scope control circuit 125 for subsequent display by the CRT scope 125a. The $T_o$ timing pulse from the detector circuit 128 is also applied to the monitor scope control circuit 125 for use in controlling the electron beam sweep of the CRT scope 125a.

Now referring to FIG. 9, the automatic signal normalizing circuit 126, the monitor scope control circuit 125, the detector circuit 128, the contrast control circuit 136, and the automatic gain control circuit 139 are shown in greater detail and FIGS. 10A–10K show the waveforms of signals found at various points in the FIG. 9 circuitry. The $S_o$ and $S_x$ signals from the cable 37 are first applied to the automatic signal normalizing circuit 126 (left side of drawing). Within this automatic signal normalizing circuit 126, these cable signals are first applied to a variable attenuator 150 which can, for example, be a standard field effect transistor type of variable resistance circuit. The attenuated signals from the variable attenuator 150 are applied to an amplifier 151 which generates the normalized $S_{on}$ and $S_{xn}$ pulses which are applied to the monitor scope control circuit 124 and detector circuit 128. These normalized signals from the automatic signal normalizing circuit 126 are shown in FIG. 10A.

To control the gain or attenuation of the variable attenuator 150, the normalized signals from amplifier 151 are applied by a resistor of aresistor 152 to the inverting input of an operational amplifier 153. The output signal from the operational amplifier 153 is applied to a peak reader 155 by way of a diode 154 such that the peak reader 155 will only be responsive to negative going pulses. The peak reader 155 then produces a DC output signal proportional to the detected peak level of the $S_o$ pulses to a low-pass filter 156 which filters out the ripple produced by the peak reading operation of the peak reader circuit 155. The resulting filtered signal is applied to one input of a differential amplifier 157, the other input thereto being derived from the wiper arm of the potentiometer 127 which produces a reference voltage. Thus, the differential amplifier 157 produces an output signal which is proportional to the difference between the reference voltage and the peak voltage of the $S_o$ pulses. This difference voltage is utilized to adjust the gain or attenuation of the variable attenuator 150.

It can be seen that this feedback circuit just described will operate to maintain the peak level of the $S_o$ pulses, on the average, equal to the reference voltage from the potentiometer 127. Thus, if the measured peak amplitude level of the $S_o$ pulses should vary from the reference voltage, the differential amplifier 157 will produce a control signal of the proper polarity to bring about the equilibrium condition where the measured peak amplitude of the $S_o$ pulses equals the reference voltage. The filter 156 prevents a few negative noise spikes from adversely affecting the gain control operation.

As seen in FIG. 10A, the negative $S_{xn}$ pulses have a positive overshoot portion which may become as great as the positive $S_{on}$ pulses. To prevent this overshoot pulse from being mistaken by the automatic signal normalizing circuit 126 as a $S_{on}$ pulse, the negative going edges of the $S_{xn}$ pulses energize a "gain control one-shot" circuit 159 which supplies the negative going "-gain control inhibit pulse" of FIG. 10B by way of a resistor 160 to the inverting input of the operational amplifier 153. The value of resistor 160 relative to the value of resistor 152 is selected such that the negative current through resistor 160 is always greater than the positive current through resistor 152 when the "gain control one-shot" 159 is energized. By making the on-time of the "gain control inhibit pulse" of FIG. 10B greater than the time interval of both the negative and positive overshoot portions of the $S_{xn}$ pulses, the output of the operational amplifier 153 will always be maintained negative while the positive overshoot portion of the $S_{xn}$ pulses are being processed. The diode 154 will then disengage the peak reader 155 from the operational amplifier 153 during this time. As illustrated by the dotted line pulse 161 of FIG. 10B, the $S_{on}$ pulses themselves can trigger the "gain control one-shot" 159. However, since the positive portion of each $S_{on}$ pulse has already passed before the one-shot 159 is triggered, there will be no adverse affect.

The normalized pulses as shown in FIG. 10A are applied to the detector circuit 128 which operates to discriminate between and separate the $S_{on}$ and $S_{xn}$ pulses. Thus inside the detector circuit 128, a $S_{on}$ discriminator 165 (e.g., a Schmitt trigger) which has a voltage threshold level sufficiently high to detect genuine $S_{on}$ pulses and reject most noise pulses, generates a shaped pulse, designated $T_o$ and shown in FIG. 10C, for each genuine $S_{on}$ pulse supplied to the detector circuit 128. A $S_{xn}$ discriminator 166 is responsive to the negative going $S_{xn}$ pulses for producing the shaped pulse of FIG. 10G. The $S_{xn}$ discriminator, like the $S_{on}$ discriminator has a threshold level sufficiently great to detect geniune $S_{xn}$ pulses and ignore most noise pulses.

The positive going edges of these output pulses from discriminator 166 trigger a "$T_o$ inhibit one-shot" 167 which operates to generate a negative going pulse. When unenergized, the output of the "$T_o$ inhibit one-shot" 167 will be at the 1 level to enable an AND gate 168. The enabled AND gate 168 passes each $T_o$ pulse to energize a "$T_x$ enable one-shot" 170 on the positive going edge to produce the negative pulse shown in FIG. 10D. The falling or leading edge of this FIG. 10D pulse from one-shot circuit 170 energizes a "single $T_o$ one-shot" 169 whose output pulse is shown in FIG. 10E. The pulses shown in FIGS. 10D and 10E are combined in an AND gate 173 to produce the pulse of FIG. 10F. This pulse from AND gate 173 is utilized to enable an AND gate 171.

To insure that only one $S_{xn}$ pulse is detected for each $T_o$ pulse, the trailing edges of the pulses from discriminator 166 energize the trigger input of a memory flip-flop 172 which is reset via its DC reset input by each pulse from the AND gate 173. The AC set input of the memory flip-flop 172 is grounded so that the flip-flop will always be triggered to its reset state. The normal output of the memory flip-flop 172 is shown in FIG. 10I. The resulting "gate control pulse" from AND gate 171, illustrated in FIG. 10I and designated $T_x$, then energizes a signal gate 174 for passing the $S_{xn}$ pulse from the automatic signal normalizing circuit 126. The gated $S_{xn}$ pulse is illustrated in FIG. 10K.

To better understand the operation of the detector circuit 128, it would perhaps be desirable to follow through this detection process in step by step sequence. Thus, first the $S_{on}$ pulse (FIG. 10A) energizes the $S_{on}$ discriminator 165 to produce the pulse, designated $T_o$, (FIG. 10C). This $T_o$ pulse then, energizes the "$T_o$ enable one-shot" 170 and the "single $T_o$ one-shot" 169 whose output pulses (FIGS. 10D and 10E) operate during coincidence thereof to enable the AND gate 173. Since the period of the "single $T_o$ one-shot" 169 extends nearly to the earliest expected arrival time of the next $S_{on}$ pulse, only one $T_o$ pulse for each $T_x$ pulse can enable the AND gates 171 and 173. Moreover, the period of the negative pulse produced by the "$T_x$ enable one-shot" 170 is sufficiently long to enable the AND gate 173, and thus gate 171, just prior to the expected arrival of the $S_{xn}$ pulse. Then, when a $S_{xn}$ pulse triggers the $S_{xn}$ discriminator 166 to generate the $S_{xn}$ discriminator output pulse (FIG. 10G), the AND gate 171 is energized to produce the $T_x$ pulse (FIG. 10J) which operates to open the signal gate 174 to pass the $S_{xn}$ pulse. Since the trailing edge of the discriminator pulse (FIG. 10G) resets the memory flip-flop 172 which can only be set after the output of AND gate 173 (FIG. 10F) goes to zero thus disabling AND gate 171, only one $S_{xn}$ pulse can be detected per $S_{on}$ pulse and then only during a time interval when a $S_{xn}$ pulse is expected (because AND gate 173 only goes to one just prior to the expected arrival of a $S_{xn}$ pulse).

The $S_{xn}$ discriminator pulse (FIG. 10G) then energizes the "$T_o$ inhibit one-shot" 167 to produce the "$T_o$ inhibit pulse" (FIG. 10H) to disable the AND gate 168 for a time period which extends until just prior to the earliest expected arrival of the next $T_o$ pulse. By so doing, the overshoot of each $S_{xn}$ pulse will not be detected as an $S_{on}$ pulse and only one $T_o$ pulse for each $T_x$ pulse will be passed by the AND gate 168.

It can thus be seen that by the arrangement of circuit elements in the detector circuit 128, only one $S_{on}$ pulse can be detected for each $S_{xn}$ pulse and only one $S_{xn}$ pulse can be detected for each $S_{on}$ pulse. Furthermore by inhibiting the detection operation for time intervals which extend until just prior to the arrival of the particular $S_{on}$ or $S_{xn}$ pulse, the probability of noise upsetting the operation of the detector circuit 128 is minimal.

The gated $S_{xn}$ pulses from signal gate 174 are then passed to the contrast control circuit 136 for further processing therein. Within the contrast control circuit 136, these negative going $S_{xn}$ pulses are supplied by way of a resistor 180 to the noninverting input of an operational amplifier 181. The output of the operational amplifier 181 is connected to the anode of a diode 182 whose cathode is connected via a feedback resistor 183 to the inverting input of the operational amplifier 181. The gated $S_{xn}$ pulses are also applied to the $S_{xn}$ peak reader 129 which generates a positive voltage signal proportional to the measured peak voltage by way of the contrast control resistor 137 to the inverting input of the operational amplifier 181.

So long as the current passing through resistor 180 is less than the current passing through resistor 137, the output of the operational amplifier 181 will be negative and the diode 182 will be back biased thus opening the feedback loop from the output of operational amplifier 181 to the input thereof. At this time, the voltage at the cathode of diode 182 will be negligible since diode 182 is turned off. However, as soon as the current through resistor 180 exceeds the current through 137, the output of operational amplifier 181 will become positive thus forward biasing diode 182 and the cathode of diode 182 will rise to a positive voltage because of current flow through diode 182 and feedback resistor 183. Since current does not flow through resistor 183 until the current through resistor 180 has reached the level of the current through resistor 137, the net effect is to pass only that portion of each gated $S_{xn}$ pulse which is greater than the level set by the contrast control resistor 137 and the measured peak voltage. Referring to FIG. 10K, the dotted line represents the threshold level of the contrast circuit 138 to produce the output pulse $S_{xp}$ (FIG. 10L). The contrast controlled $S_{xn}$ pulse, which comprises the $S_{xp}$ pulse is, in effect, that portion (hatched line area) of the gated $S_{xn}$ pulse (FIG. 10K) which is greater than the contrast circuit threshold level (the current through resistor 137) of the contrast circuit 138.

To obtain the greatest possible contrast, the switch 138 can be placed in the "Black and White" position, so as to pass the output pulse from the operational amplifier 181 to the gain control circuits. The output pulse from the operational amplifier 181, designated $T_{x2}$, is shown in FIG. 10M and will always change to a large positive level upon the detector threshold level being exceeded. Thus, by placing switch 138 in the "Black and White" position, there will be no gray areas in the picture produced by the recorder 46, but only "Black and White" depending on whether or not $S_{xn}$ pulses have exceeded the contrast circuit threshold level.

Now concerning the automatic gain control circuit 139, the selected signal from switch 138 is applied to a variable attenuator circuit 188 and an amplifier 189. The output of the amplifier 189 is then applied to the input of a sample and hold circuit 192 which reads the peak amplitude of the positive going pulses from the contrast circuit 136. The sample and hold circuit 192 stores this measured peak voltage for application to a differential amplifier 193 by way of a low-pass filter 194 and the AGC contact of the switch 138a. The switch 138a is mechanically ganged with the switch 138 found on the input circuit connection to the automatic gain control circuit 139.

To reset the sample and hold circuit 192, the leading edge of each $T_{x2}$ pulse energizes a reset one-shot 195 to generate a positive going pulse having an on-time which extends nearly to the next $T_{x2}$ pulse, as shown in FIG. 10N. The output signal of the sample and hold circuit 192 is shown in FIG. 10P where it can be seen that the amplitude level is returned to zero volts in response to each reset pulse (FIG. 10N). At the termination of each reset pulse, the output voltage from sample and hold circuit 192 returns to the level of the new pulse from contrast control circuit 136. This output voltage (FIG. 10P) is then passed by way of a resistor 190 to the noninverting input of an operational amplifier 191. The ripple filter 142 operates to substantially remove the amplitude fluctuations arising from resetting the sample and hold circuit 192. Thus, it can be seen that the signal applied to the scope intensity input will be essentially a DC signal which changes level whenever the picture pulses from the contrast circuit 136 changes level. By so doing, a smooth continuous image will be reproduced on film. If desired, however, the filter 142 could be omitted in which case a gray background level would appear on the picture.

The automatic gain control circuit 139 also includes means for adding a fixed brightness bias to the picture image. To this end, each positive going output pulse from the reset one-shot 195 is passed by way of the brightness control variable resistor 141 to the noninverting input of the operational amplifier. The operational amplifier 191 then sums the the resistors 141 and 190 to produce an output signal for application to the CRT scope intensity control of recorder 46 via the ripple filter 142. Looking at FIGS. 10N and 10P in conjunction, it can be seen that by proper setting of the brightness control resistor 141, a fixed amount of signal level will be added (or subtracted by using both inputs to amplifier 191, if desired) to the output signal of FIG. 10N to control picture brightness.

In the automatic gain control circuit 139, the low-pass filter 194 operates to smooth out the fluctuations in the signal (FIG. 10P) from the sample and hold circuit 192. This DC signal from low-pass filter 194 is compared with the reference voltage from the gain set resistor 140 by the differential amplifier 193. The resulting difference voltage is applied to the gain adjust input of the variable attenuator. By this arrangement, the peak amplitude level of the output pulses from amplifier 189 will be maintained, on an average, at the level set by the gain set resistor 140.

The time constant of the low-pass filter 194 is sufficiently high that the gain adjust operation will take place in a rather slow manner so that relatively fast intensity variations will show up on the picture, yet slow drifts in circuit operating characteristics or movement of the well tool from one formation to another will not produce drastic changes in picture brightness. That is to say, it is the reflected energy variations over not too great a borehole interval that is important so that, among other things, cracks or cavities in the borehole wall or casing will show up on the picture. Of course, if desired, switches 138 and 138a could be placed in the "manual gain control" position if it were desired to see received or reflected energy variations over great borehole intervals.

Now concerning the scope monitor circuit 124 in greater detail, and referring to FIGS. 9 and 11A–11E in conjunction, the leading edges of the $T_0$ pulses from detector circuit 128, shown in FIG. 11B, energize a delay one-shot 200 whose pulse output is illustrated in FIG. 11C. The trailing edges of these delay pulses from one-shot 200 energize a "sweep reset one-shot" 201 which generates the "sweep reset pulse" shown in FIG. 11D.

A capacitor 203 is charged up at a constant rate by a constant current being applied through a high value resistor 202 from a DC voltage source. The capacitor 203 is then discharged to zero volts by the "sweep reset pulse" (FIG. 11D) acting to turn on a NPN transistor 206. The resulting sawtooth wave shape on capacitor 203, illustrated in FIG. 11E, is supplied to a horizontal sweep amplifier 204 for application to the horizontal sweep input of the cathode ray tube oscilloscope 125a. The $S_{on}$ and $S_{xn}$ pulses from the automatic signal normalizing circuit 126 are then applied to a vertical deflection amplifier 205 which drives the vertical deflection input of the scope 125a.

It can be seen that by delaying the generation of the horizontal sweep ramp voltage until a fixed time interval after each $T_o$ pulse, which delay time interval is less than the time interval between successive $T_o$ pulses, both the $S_{on}$ and $S_{xn}$ pulses can be displayed. In other words, the scope electron beam will start to move horizontally across the face of the CRT scope each time before the $S_{on}$ pulse is applied to the vertical deflection amplifier 209. Thus, the electron beam will be swept across the face of the scope while being modulated in a vertical direction by the $S_{on}$ and $S_{xn}$ pulses. This then produces a waveform display of these $S_{on}$ and $S_{xn}$ pulses.

To adjust the gain of the gain set circuit 106 in the receiver channel, at the surface is a gain adjust circuit 40 (FIG. 2A) which includes a "selection one-shot" circuit 115. Circuit 115 is energized on the rising edge of a signal produced by closing a switch 116 and supplying a DC voltage to the input of the one-shot circuit 115. The resulting "selection pulse" output of circuit 115 is shown in FIG. 7A. A variable resistor 41 comprises part of the timing circuitry of the one-shot 115 for adjusting the duty cycle or on-time of the "selection pulse" output. This "selection pulse" output is supplied to one input of an AND gate 117, the other input thereto being derived from the output of a "gain adjust one-shot" circuit 118 which is normally at the 1 level. Thus, when the "selection one-shot" 115 is energized, the ouput of the AND gate 117 will rise to the 1 level to energize a delay one-shot circuit 119 on this rising edge. The output pulse from delay one-shot circuit 119 is shown in FIG. 7B. The trailing or falling edges of the pulses from delay one-shot circuit 119 energize a "gain adjust one-shot" circuit 118 to produce negative pulses as shown in FIG. 7C. The negative pulses as shown in FIG. 7C. The negative pulses (FIG. 7C) are supplied to an inverting power amplifier 120 to produce the inverted "gain adjust pulses" shown in FIG. 7D for application to a cable channel 37.

The rising edge of each "gain adjust pulse" from the one-shot 118 will then re-energize the delay one-shot circuit 119 by way of the AND gate 117 to eventually cause another "gain adjust pulse" to be generated from the one-shot circuit 118. This process continues until the "selection one-shot" circuit 115 turns off to disable the AND gate 117. When the "selection one-shot" circuit 115 turns off, as represented by the trailing edge of the "selection pulse" of FIG. 7A, the delay one-shot circuit 119 having already started its timing cycle, will proceed to energize the "gain adjust one-shot" circuit 118 to produce an additional "gain adjust pulse". However, when the "gain adjust one-shot" circuit 118 turns off ("gain adjust pulse" shown in FIG. 7C rises), the AND gate 117 will be disabled to prevent the cycle from repeating itself. Thus, the duty cycle of the "selection one-shot" circuit 115, as controlled by the variable resistor 41, controls the number of "gain adjust pulses" which are produced in each burst of pulses.

In the downhole gain adjust circuit 38 (FIG. 2B), the arriving "transmitted gain adjust pulses" (FIG. 7D) can be distorted by transmission on the cable channel 37 due to cable characteristics. A shaping circuit 121 is therefore provided to reshape the transmitted pulses to resemble the "transmitted gain adjust pulses" of FIG. 7D. For convenience of explanation the output of shaping circuit 121 may be considered as the pulses illustrated in FIG. 7D. The rising edge of the first reshaped "transmitted gain adjust pulse" 122 (FIG. 7D) energizes a reset one-shot circuit 122 to produce a reset pulse (FIG. 7E). (It should be noted here that there will be some time lag due to the transmission through the cable which is not shown in FIG. 7E for purposes of clarity but will not affect the time correlation of the surface and downhole functions.) The duty cycle of the reset one-shot circuit 122 is greater than the maximum anticipated time for the maximum number of "gain adjust pulses" to be transmitted from the surface of the earth. Thus, only one reset pulse will be generated for each burst of "gain adjust pulses". The rising edge of the reset pulse of FIG. 7E resets a binary counter 123 to its zero or initial condition state. This reset is represented as the positive going pulse of FIG. 7E. The negative going or lagging edges of the "gain adjust pulses" of FIG. 7D energize the count input of the binary counter 123 which proceeds to count the number of "transmitted gain adjust pulses". The various stages of the binary counter 123 are connected to a binary-to-decimal matrix 124 for decoding the binary number by binary counter 123 into a decimal number. Thus, a selected one of the output leads from matrix 124 wll be energized to control the gain set circuit 106 and set a selected gain into the gain set circuit 106 of the receiver channel. The gain set circuit 106 can, for example, comprise relays connected to each output lead from matrix circuit 124 for switching selected resistors into the receiver channel and thus adjusting the gain (or attenuation gain less than one) thereof.

In operation, the surface gain adjust circuit 40 generates a burst of "gain adjust pulses", the number of which signifies the amount of gain to be set into the receiver channel of the signal control circuit 35. The number of such "gain adjust pulses" is set by the variable resistor 41. In the downhole gain adjust circuit 38, the binary counter 123 is cleared or reset by the leading edge of the first "gain adjust pulse" and the trailing edges of all of the "gain adjust pulses" are counted by the binary counter 123 to set the desired gain setting into the gain set circuit 106. This gain set operation enables adjustment of the amplitude of the received signals $S_x$ for varying conditions of the media surrounding the well tool 15.

Figure 12:
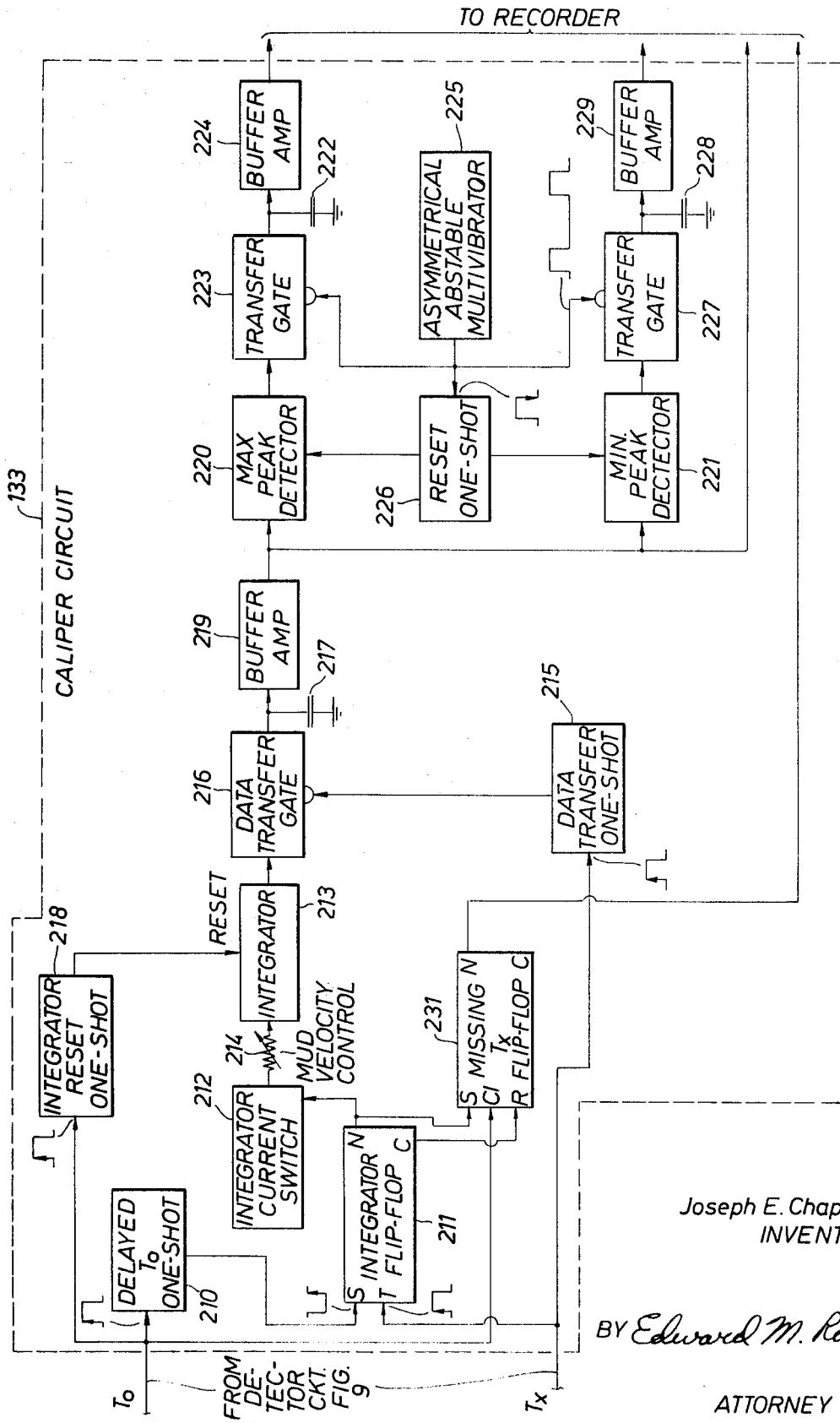
FIG. 12 illustrates certain other portions of the FIG. 2A surface electronics in greater detail.

Caliper circuit 133 is shown in FIG. 12. The leading edge of the $T_o$ pulses, shown in FIG. 13A, energize a "delayed $T_o$ one-shot" 210 which produces the "delayed $T_o$ pulse" (FIG. 13B). The trailing edge of the "delayed $T_o$ pulse" sets an "integrator flip-flop" 211 whose normal output energizes an "integrator current switch"

212 which comprises a gated constant current source. The constant current generated by the "integrator current switch" 212 is integrated by a suitable integrator 213 by way of a variable resistor 214 which adjusts the charging current in accordance with the characteristic value of well bore mud velocity. The leading edges of the $T_x$ pulses, shown in FIG. 13C, toggle the "integrator flip-flop" 211 so as to change its state from the normal to complement state to thereby de-energize the "integrator current switch" 212.

Thus, as shown in FIG. 13D, charging current will be applied to the integrator 213 from a time beginning with the trailing edge of the "delayed $T_o$ pulse" (FIG. 13B) and terminating with the leading edge of the $T_x$ pulse (FIG. 13C). The resulting output of the integrator 213 is shown in FIG. 13E. It can thus be seen that the voltage level to which the integrator 213 charges will be representative of the time interval between the end of the "delayed $T_o$ pulse" of FIG. 13B and beginning of the subsequent $T_x$ pulse (FIG. 13C). Since the period of the pulse produced by the "delayed $T_o$ one-shot" 210 is constant, the voltage on the output of the integrator 213 will be proportional to the time interval between each set of $T_o$ and $T_x$ pulses minus an off-set. This off-set corresponds to the period of the pulse produced by the "delayed $T_o$ one-shot" 210. The reason for this off-set is to compensate for the delay between the generation of each $T_o$ pulse and the transmitter firing, the transducer 22 being off-centered from the center of the well tool, and the difference in acoustic velocity inside and outside the well tool. Desirably, this off-set is chosen so that all of the above factors cancel out and the voltage on the output of integrator 213 will be proportional to well bore diameter.

To transfer the voltage reading on the integrator 213 to subsequent circuits, the leading edge of each $T_x$ pulse energizes a "data transfer one-shot" 215 whose output pulse is shown in FIG. 13G. This "data transfer pulse" energizes a "data transfer gate" 216 which transfers the voltage stored by the integrator 213 to a storage capacitor 217. To reset the integrator 213, the leading edge of each $T_o$ pulse energizes an "integrator reset one-shot" 218 whose output pulse is shown in FIG. 13F. This "integrator reset pulse" is then applied to the integrator 213 for resetting it to its initial level, as seen by comparing FIGS. 13E and 13F. Since the integrator reset operation always occurs prior to the setting of the "integrator flip-flop" 211, i.e., the period of the "integrator one-shot" 218 is less than the period of the "delayed $T_o$ one-shot" 210, the integrator 213 will always be reset prior to its integrating operation and the subsequent data transfer.

A high input impedance buffer amplifier 219 is responsive to the voltage stored on the storage capacitor 217 for applying this voltage to a maximum peak detector 220 and a minimum peak detector 221. Additionally, this output voltage from the buffer amplifier 219 is applied to the recorder 46 to provide an indication of the average borehole radius or diameter. This output voltage from buffer amplifier 219 is shown in FIG. 13H. The inherent frequency response of the galvanometers of recorder 46 will provide suitable filtering of this FIG. 13H output signal so that rapid changes in output voltage during the data transfer operation will not be recorded, and then an averaged measurement will be obtained. However, if a recording device other than a galvanometer type recorder is utilized, such as a magnetic tape recorder, a suitable electronic filter could be utilized.

The maximum peak detector 220 operates to detect the maximum voltage level of the output voltage from buffer amplifier 210 for each cycle of operation of the integrator 213 and thus has a fast charging rate and slow discharge rate. The resulting peak amplitude detected by the maximum peak detector 220 is transferred to a storage capacitor 22 by way of a transfer gate 223. A high input impedance buffer amplifier 224 is then responsive to the voltage stored on the capacitor 22 for applying this voltage to the recorder 46. An asymmetrical abstable multivibrator having a period which is slightly greater than the time for the rotating transducer 22 of FIGS. 1 and 2 to make one complete revoltuion around the borehole, energizes the transfer gate 223 so as to transfer the measured peak voltage to the storage capacitor 222 approximately once per revolution of the borehole wall. After the voltage stored by the maximum peak detector 222 has been transferred, the trailing or falling edge of each pulse from the multivibrator 225 energizes a reset one-shot 226. The resulting pulse resets the maximum peak detector 222 to a desirable low value reference voltage in readiness for the next revolution.

Concerning the minimum peak detector circuitry, the minimum peak detector 221 is also reset by the pulse from the reset one-shot 226, but unlike the maximum peak detector 220, the minimum peak detector 221 is initially reset to a voltage level greater than the largest anticipated voltage from the buffer amplifier 219. Thus, when the data transfer gate 216 transfers the voltage from the integrator 213 to the storage capacitor 217, the minimum peak detector 221 will discharge to the voltage stored on the caacitor 217 and will continue to discharge to the voltage stored on capacitor 217 during every subsequent data transfer operation from integrator 213 provided this new voltage is less than the voltage already stored by the minimum peak detector. The abstable multivibrator 225 then energizes a transfer gate 227 for transferring the voltage measured by the minimum peak detector 221 to a storage capacitor 228. A high input impedance buffer amplifier 229 is then responsive to this stored voltage for driving the recorder 46 to produce an indication of the minimum well bore radius or diameter per revolution or scan of the well bore wall.

In the event that a $T_x$ pulse is not received by the caliper circuit 133, the integrator 213 would continue charging until reset by an "integrator reset pulse" of FIG. 13F from the "integrator reset one-shot" 218. Since each $T_x$ pulse also produces data transfer of this integrator voltage, this large voltage would not be transferred to the storage capacitor 217 and thus the previous radius or diameter measurements would be recorded. While an occasional missing $T_x$ occurrence could be tolerated, a relatively large number of such occurrences could possible give inaccurate readings. In this connection, it would be desirable to provide an indication of the absence of $T_x$ pulses.

Thus, referring back to FIG. 12, the normal and complementary output of the "integrator flip-flop" 211 are connected to the set and reset inputs respectively of a "missing $T_x$ flip-flop" 231. The flip-flop 231 is clocked by the $T_o$ pulses, i.e., a coincidence of a $T_o$ pulse on the clock input and a voltage on either the set or reset input is required before the flip-flop 231 will change to its normal or complementary states respectively. Thus, if the "integrator flip-flop" 211 is still in its set or normal state when the $T_o$ pulse appears, the "missing $T_x$ flip-flop" 231 will be placed in its set or normal state. If, on the other hand, the "integrator flip-flop" 211 has been reset by a $T_x$ pulse before the next $T_o$ pulse appears, the "missing $T_x$ flip-flop" would be placed in its reset or complementary state. Since the normal output of flip-flop 231 being at the 1 level indicates missing $T_x$ pulses, this normal output is applied to channel 8 of recorder 46. For a more detailed explanation of the caliper circuits, refer to copending application Ser. No. 827,798 by G. L. Leger filed on May 26, 1969, now U.S. Pat. No. 3,590,940, which is assigned to the assignee of the present invention.

It should be noted that, if desired, the $S_{xn}$ peak reading circuit 129 of FIG. 2B could be periodically reset in the same manner as are the maximum or minimum peak detectors of FIG. 12. By so doing, the $S_{xn}$ peak reader 129 would be able to more quickly reflect changes in lithology (especially decreases in peak signal amplitude). Moreover, as an alternative to the peak reader (either $S_{xn}$ or caliper peak reader) being periodically reset by a free running local oscillator, it would be periodically reset by the orientation signals.

Figure 14:
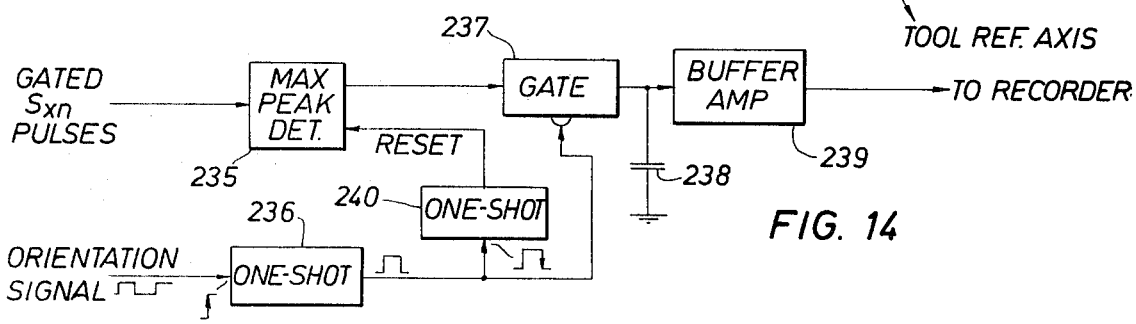
FIG. 14 is an example of an alternative circuit embodiment which could be used with certain circuits shown in FIGS. 9 and 12.

In FIG. 14, there is shown an alternative embodiment for the $S_{xn}$ peak reader used for formation lithology determination. The negative going gated $S_{xn}$ pulses are applied to a maximum peak detector circuit 235 which operates in the same fashion as the maximum peak detector 220 of FIG. 12. (Note: This peak detecting circuit 235 measures the peak amplitude of negative pulses while the circuit 220 operates on positive ones. This can be accounted for by reversing the input diode in circuit 235.) The rising edge of the orientation signal from switch 144 (FIG. 2A) energizes a one-shot 236 once per revolution of the rotating transducer 22. The resulting pulse opens a gate 237 to transfer the measured peak voltage to a storage capacitor 238 for application to channel 4 (the lithology channel) of the recorder 46 via a high input impedance buffer amplifier 239. To reset the maximum peak detector 235, the trailing edge of the output pulse from one-shot 236 energizes a one-shot 240. The resulting pulse from one-shot 240 resets the maximum peak detector circuit 235 to a suitable reference voltage, e.g., zero volts to prepare for another scan of the rotating transducer 22 around the well bore.

It should be mentioned here that when using the orientation signal for reset purposes, this reset operation will occur synchronously with a fixed azimuthal orientation. Since an $S_{xn}$ pulse cannot be processed by the peak detector while it is being reset, there is a slight chance that a vertical cavity in the well bore wall would be ignored. To prevent this from happening, it is presently considered preferable to use a fast charge, slow discharge peak reading circuit for lithology determination. For the same reason, it is presently considered preferable to use a local non-synchronous oscillator in the caliper computing circuits, i.e., the multivibrator 225 of FIG. 12.

While there have been described what are at present considered to be preferred embodiments of this invention, it will be obvious to those skilled in the art that various changes and modifications may be made therein without departing from the invention, and it is, therefore, intended to cover all such changes and modifications as fall within the true spirit and scope of the invention.

What is claimed is:

1. Apparatus for investigating earth formations traversed by a well bore, comprising:
    an elongated well tool having means for repetitively emitting energy in a selected direction into a media surrounding said well tool and for receiving a portion of the emitted energy which is reflected back from a well bore wall to produce an electrical signal representative thereof;
    means for rotating said energy emitting and receiving means about the longitudinal axis of said well tool so that said emitted energy will be sequentially directed at various circumferential portions of a well bore wall; and
    means for selecting a maximum peak amplitude from among said electrical signals produced over a selected period of time and for generating an output signal representative thereof to provide information regarding the character of the media surrounding a well bore.

2. Apparatus for investigating earth formations traversed by a well bore, comprising:
    an elongated well tool having means for repetitively emitting acoustic energy in a selected direction into a media surrounding said well tool and for receiving a portion of the emitted energy which is reflected back from a well bore wall to produce an electrical signal representative thereof;
    means for rotating said energy emitting and receiving means about the longitudinal axis of said well tool so that said emitted energy will be sequentially directed at various circumferential portions of a well bore wall; and
    means for selecting a maximum peak amplitude from among said electrical signals produced for each revolution of said energy emitting and receiving means and for generating an output signal representative thereof to provide information regarding the character of the media surrounding a well bore.

3. Apparatus for investigating earth formations traversed by a well bore, comprising:
    an elongated well tool having means for repetitively emitting acoustic energy in a selected direction into a media surrounding said well tool and for receiving a portion of the emitted energy which is reflected back from a well bore wall after each emission of energy to produce electrical pulses representative thereof;
    means for rotating said energy emitting means about the longitudinal axis of said well tool so that said emitted energy will be sequentially directed at various circumferential portions of a well bore wall;
    means for measuring the peak amplitudes of said electrical pulses and generating an output signal representative of only the maximum of said peak amplitudes over a selected period of time; and means for recording said output signal as a function of well bore depth to provide information relative to the acoustic impedance of the media defining the well bore.

4. Apparatus for investigating earth formations traversed by a well bore, comprising:
  an elongated well tool having means for repetitively emitting acoustic energy in a selected direction into a media surrounding said well tool and for receiving a portion of the emitted energy which is reflected back from a well bore wall after each emission of energy to produce electrical pulses representative thereof;
  means for rotating said energy emitting means about the longitudinal axis of said well tool so that said emitted energy will be sequentially directed at various circumferential portions of a well bore wall;
  means for selecting a peak amplitude from among said electrical pulses during each revolution and generating an output signal representative thereof;
  means for periodically resetting said measuring means, said reset time period being at least as long as the time required for one revolution of said energy emitting and receiving means around the well bore; and
  means for recording said output signal as a function of well bore depth.

5. A method of investigating earth formations traversed by a well bore, comprising:
  moving a well tool through a well bore;
  repetitively emitting energy in a selected direction into a media surrounding said well tool and receiving a portion of the emitted energy which is reflected back from a well bore wall to produce an electrical signal representative thereof;
  rotating the energy emitting and receiving means about a longitudinal axis of said well tool so that said emitted energy will be sequentially directed at various circumferential portions of a well bore wall; and
  selecting the maximum peak amplitude value from among the peak amplitudes of those received electrical signals produced during a selected period of time for providing information regarding the character of a formation surrounding a well bore.

6. A method of investigating earth formations traversed by a well bore, comprising:
  moving a well tool through a well bore;
  repetitively emitting acoustic energy in a selected direction into a media surrounding said well tool and receiving a portion of the emitted energy which is reflected back from a well bore wall to produce an electrical signal representative thereof;
  rotating the energy emitting and receiving means about a longitudinal axis of said well tool so that said emitted energy will be sequentially directed at various circumferential portions of a well bore wall; and
  selecting a maximum peak amplitude value from among the peak amplitudes of those received electrical signals produced during each revolution of said energy emitting and receiving means for providing information regarding the character of a formation surrounding a well bore.

7. Apparatus for obtaining a measurement relative to the cross section of a well bore, comprising:
  a well tool having transducer means for directionally emitting energy into a media surrounding said well tool and receiving energy reflected back from a well bore wall, means for rotating said transducer means so that said emitted energy will be sequentially directed at various circumferential portions of a well bore wall, circuit means for repetitively energizing said transducer means to emit energy and developing electrical signals representative of the times at which energy is emitted and received by said transducer means;
  means for measuring the time separation between each set of said energy emitting and energy received electrical signals and producing an output signal representative of the time separation of each set; and
  means for measuring at least one of the maximum or minimum amplitude levels of said output signals over a selected time interval, which substantially corresponds with the time for the directional transducer means to complete one revolution around a well bore, and generating an output signal representative thereof to thereby enable a determination of the maximum or minimum well bore cross-sectional dimensions per revolution.

8. Apparatus for obtaining a measurement relative to the cross section of a well bore, comprising:
  a well tool having transducer means for directionally emitting energy into a media surrounding said well tool and receiving energy reflected back from a well bore wall, means for rotating said transducer means so that said emitted energy will be sequentially directed at various circumferential portions of a well bore wall, circuit means for repetitively energizing said transducer means to emit energy and developing electrical signals representative of the times at which energy is emitted and received by said transducer means;
  means for measuring the time separation between each set of said energy emitting and energy received electrical signals and providing an output signal representative of the time separation of each set;
  means for measuring at least one of the maximum or minimum amplitude levels of said output signals and generating an output signal representative thereof to provide an indication of the maximum or minimum cross-sectional dimensions of a well bore; and
  timing means for resetting said maximum or minimum amplitude measuring means at selected time intervals which intervals are at least as great as the time for said transducer means to make one complete revolution around a well bore.

9. Apparatus for obtaining a measurement relative to the cross section of a well bore, comprising:
  a well tool having transducer means for directionally emitting energy into a media surrounding said well tool and receiving energy reflected back from a well bore wall, means for rotating said transducer means so that said emitted energy will be sequentially directed at various circumferential portions of a well bore wall, circuit means for repetitively energizing said transducer means to emit energy and developing electrical signals representative of the times at which energy is emitted and received by said transducer means;

means for measuring the time separation between said energy emitting and energy received electrical signals; and means responsive to said energy emitting and energy received electrical signals for detecting the absence of a received energy signal after each emitted energy signal to provide an indication of the authenticity of said time separation measurement.

10. A surface measuring device for obtaining a measurement related to the cross section of a well bore from time spaced sets of electrical signals representative of a time of emission and reception of energy normal to the axis of a well bore where the signals are related to successive circumferential points of a well bore, comprising:

means for measuring the time separation between the signals of each time spaced set of electrical signals and providing an output signal representative thereof; and means for measuring at least one of the maximum or minimum amplitude levels of said output signals over a selected time interval and for generating an output signal representative thereof to provide information of the maximum or minimum cross-sectional dimensions of a well bore.

11. In well bore measuring apparatus of the type where a well tool emits energy into a media surrounding said well tool with a directional transducer means and receives energy reflected back from a well bore wall while rotating said transducer means and develops electrical signals representative of the times at which energy is emitted and received by said transducer means for transmission to the surface of the earth, apparatus for processing said electrical signals, comprising:

means at the surface of the earth for receiving said transmitted electrical signals;

means for measuring the time separation between the signals of each set of said energy emitting and energy received electrical signals and providing an output signal representative thereof; and means for selecting one of the maximum or minimum amplitude levels of said output signals produced over a selected time interval, which substantially corresponds with the time for the directional transducer means to complete one revolution around a well bore, and generating an output signal representative thereof to thereby enable the maximum and minimum borehole radius per revolution to be determined.

12. Apparatus for obtaining a measurement relative to the cross section of a well bore, comprising:

a well tool having tansducer means for directionally emitting energy into a media surrounding said well tool and receiving energy reflected back from a well bore wall, means for rotating said transducer means so that said emitted energy will be sequentially directed at various circumferential portions of a well bore wall, circuit means for repetitively energizing said transducer means to emit energy and developing electrical signals representative of the times at which energy is emitted and received by said transducer means;

means for measuring the time separation between said energy emitting and energy received electrical signals and providing an output signal representative of the time separation of each set;

means for measuring and storing the maximum amplitude of said output signals;

means for measuring and storing the minimum amplitude of said output signals;

timing means for resetting the maximum amplitude means to a voltage level less than the smallest expected output signal amplitude and the minimum amplitude means to a voltage level greater than the largest expected output signal amplitude at selected time intervals which are at least as long as the time interval for said transducer means to complete one revolution in a well bore; and means for reading the stored maximum and minimum amplitude levels from said maximum and minimum measuring and storing means to produce indications of the maximum and minimum radius of a well bore.

13. A method for obtaining a measurement relative to the cross section of a well bore, comprising:

moving a well tool through a well bore;

repetitively emitting energy from a directional transducer means into a media surrounding said well tool and receiving energy reflected back from a well bore wall to produce electrical signals representative of the times that energy is emitted and received;

rotating said transducer means so that said emitted energy will be sequentially directed at various circumferential portions of a well bore wall;

measuring the time separation between each set of said energy emitting and energy received electrical signals and producing an output signal representative of the time separation of each set; and measuring at least one of the maximum or minimum amplitude levels of said output signals over a selected time interval, which substantially corresponds with the time for the directional transducer means to complete one revolution around a well bore, and generating an output signal representative thereof to thereby enable a determination of the maximum or minimum well bore cross-sectional dimensions per revolution.

14. A method for obtaining a measurement relative to the cross section of a well bore, comprising:

moving a well tool through a well bore;

repetitively emitting energy from a directional transducer means into a media surrounding said well tool and receiving energy reflected back from a well bore wall to produce electrical signals representative of the times that energy is emitted and received;

rotating said transducer means so that said emitted energy will be sequentially directed at various circumferential portions of a well bore wall;

measuring the time separation between said energy emitting and energy received electrical signals for providing a measure of the radius of a well bore; and detecting the absence of a received energy signal after each emitted energy signal to provide an indication of the authenticity of said time separtion measurement.

15. In a well logging system apparatus for selecting an operating gain condition of an amplifer in a well tool in a well bore from the surface of the earth comprising:
  means at the surface of the earth for generating a selected number of pulses for transmission to a well tool in a well bore;
  binary counting means at the well tool for counting the number of transmitted pulses;
  variable gfain amplifier means in said well tool; and
  means responsive to the state of said counting means for setting the gain condition of said variable gain amplifier, the number of generated pulses determining the gain condition of said variable gain amplifier.

16. A well logging system comprising:
  a longitudinally extending well tool having means for repetitively emitting energy into a media surrounding said well tool and receiving at least a portion of said energy after each energy emission to develop electrical pulses representative thereof, means for rotating said energy emitting and receiving means about the well tool axis so that said emitted energy will be sequentially directed at various circumferential portions of a well bore wall;
  means for measuring the peak amplitude of said electrical pulses and generating an output signal representative thereof;
  means for comparing the amplitude of each received electrical pulse with a selected fraction of the amplitude of said measured peak amplitude output signal and generating a substantially constant amplitude pulse whenever said pulse amplitude exceeds said selected amplitude fraction; and
  means responsive to said constant amplitude pulses for providing a record of the character of at least a portion of the media surrounding the well tool whereby only those received pulses whose amplitudes exceed said selected amplitude fraction will be recorded.

17. The apparatus of claim 16 wherein said means for providing a record includes a recording medium, means for producing a radiant energy beam and repetitively sweeping said beam across said recording medium, and means for modulating said beam with said constant amplitude pulses to enable a picture of a media surrounding the well tool to be made on said recording medium whereby the contrast for said constant amplitude pulses on said recording medium will be substantially constant.

18. A well logging system comprising:
  a well tool having means for repetitively emitting energy into a media surrounding said well tool and receiving at least a portion of said energy to develop electrical pulses representative thereof, and means for transmitting said electrical pulses to the surface of the earth;
  means at the surface of the earth for receiving said transmitted electrical pulses;
  means responsive to each received electrical pulse for generating a control pulse having a preselected time duration;
  means for measuring the amplitude of each received electrical pulse and storing a voltage proportional to said measured amplitude in response to each control pulse; and
  means responsive to said stored voltage for providing an indication of the character of at least a portion of the media surrounding the well tool.

19. A well logging system comprising:
  a well tool having means for repetitively emitting energy into a media surrounding said well tool and receiving at least a portion of said energy to develop electrical pulses representative thereof, and means for transmitting said electrical pulses to the surface of the earth;
  means at the surface of the earth for receiving said transmitted electrical pulses;
  means responsive to each received electrical pulse for generating a control pulse having a preselected time duration;
  means for measuring the amplitude of each received electrical pulse and storing a voltage proportional to said measured amplitude in response to each control pulse, said stored voltage being reset to a selected reset value in the absence of said control pulse;
  combining means for combining said stored voltage with a selected portion of each control pulse to produce output pulses; and
  means for recording said output pulses to provide a record of a characteristic of at least a portion of a media surrounding said well tool.

20. The apparatus of claim 19 wherein said recording means includes a record medium, means for producing a radiant energy beam and repetitively sweeping said beam across said record medium, means for modulating said beam with said output pulses to produce a picture image of a portion of the surrounding media whereby the combination of said selected portion of each control pulse with said stored voltage produces an adjustment to the brightness of said picture image.

21. In a well logging system of the type where a well tool repetitively emits energy into a media surrounding said well tool and receives at least a portion of said energy to develop electrical pulses representative thereof for transmission to the surface of the earth, apparatus at the surface of the earth for receiving and processing said transmitted electrical pulses, comprising:
  means responsive to each received electrical pulse for generating a control pulse having a preselected time duration;
  means for measuring the amplitude of each received electrical pulse and storing a voltage proportional to said measured amplitude in response to each control pulses; and
  means responsive to said stored voltage for providing an indiction of the character of at least a portion of the media surrounding the well tool.

22. A method of investigating a media surrounding a well tool, comprising:
  repetitively emitting energy into a media surrounding said well tool and receiving at least a portion of said energy to develop electrical pulses representative thereof;
  generating a control pulse having a preselected time duration in response to each electrical pulse;
  measuring the amplitude of each electrical pulse and storing a voltage proportional to said measured amplitude in response to each control pulse; and providing an indication of the character of at least a portion of the media surrounding the well tool in response to said stored voltage.

23. A well logging system comprising: a well tool having means for repetitively emitting energy into a media surrounding said well tool and receiving at least a portion of said energy after each energy emission to develop electrical pulses representative thereof;
- means responsive to each electrical pulse for generating a control pulse having a preselected time duration;
- variable gain or attenuation means for adjusting the amplitude of said pulses;
- means for measuring the amplitude of each amplitude adjusted pulse and storing a voltage proportional to said measured amplitude in response to each control pulse;
- means for comparing said stored voltage with a reference voltage and adjusting the gain or attenuation of said variable gain or attenuation means to maintain said amplitude adjusted pulses at a substantially constant level; and
- means responsive to said stored voltage for providing an indication of the character of at least a portion of the media surrounding the well tool.

24. A well logging system, comprising:
- a well tool adapted for movement through a well bore and having means for repetitively emitting energy in selected directions into a media surrounding said well tool and receiving that portion of the emitted energy which is reflected back from a well bore wall to produce electrical pulses representative of the reflected energy, means for rotating said energy emitting and receiving means about the longitudinal axis of said well tool so that said emitted energy will be sequentially directed at various circumferential portions of a well bore wall, means responsive to said rotation for producing an orientation signal representative of the orientation of said energy emitting and receiving means, and means for transmitting said electrical pulses and orientation signal to the surface of the earth;
- means at the surface of the earth for receiving said transmitted pulses and orientation signal;
- means for measuring the peak amplitude of a plurality of said received pulses and generating an output signal representative thereof;
- contrast control means for passing a portion of each pulse which is greater than a selected fraction of said output signal;
- automatic gain control means for adjusting the amplitude level of said passed pulse portions from said contrast control means in response to the time averaged amplitude of said passed pulse portions to maintain the signal strength of said passed pulse portions substantially equal to a reference amplitude on the average; and
- recording means including a record medium, means for generating a radiant energy beam, means responsive to said orientation signal for repetitively sweeping said beam across said record medium in synchronism with the rotation of said energy emitting and receiving means, means for modulating said beam with representations of the amplitude adjusted pulses from said gain control means, and means for moving said record medium in correlation with the movement of said well tool to thereby produce a picture image of the well bore wall on said record medium, whereby said contrast control means maintains the picture contrast at a desired level and said gain control means maintains the brightness of the picture at a desired level.

25. A method of investigating a media surrounding a well tool, comprising:
- moving a well tool through a well bore;
- repetitively emitting energy in a selected direction into a media surrounding said well tool and receiving that portion of the emitted energy which is reflected back from a well bore wall to produce electrical pulses representative of the reflected energy;
- rotating said energy emitting and receiving means about the longitudinal axis of said well tool so that said emitted energy will be sequentially directed at various circumferential portions of a well bore wall;
- measuring the peak amplitude of a plurality of said pulses;
- passing that portion of each pulse which is greater than a selected fraction of said measured peak amplitude;
- adjusting the amplitude level of said passed pulses in response to the time averaged peak amplitude of said passed pulses to maintain the peak signal strength of said passed pulses substantially equal to a reference amplitude on the average; and
- recording said passed, amplitude adjusted pulses on a record medium, including generating a radiant energy beam, repetitively sweeping said beam across said record medium in synchronism with the rotation of said energy emitting and receiving means, modulating said beam with representations of the passed, amplitude adjusted pulses, and moving said record medium in correlation with the movement of said well tool to thereby produce a picture image of the well bore wall on said record medium, whereby the step of passing a selected portion of each pulse operates to maintain the picture contrast at a desired level and the step of adjusting the amplitude level of said pulses operates to maintain the peak brightness of the picture at a desired level on the average.

26. Apparatus for investigating earth formations traversed by a well bore, comprising:
- a well tool adapted for movement through a well bore and having means for repetitively emitting energy in selected directons into a media surrounding said well tool and receiving that portion of the emitted energy which is reflected back from a well bore wall to produce electrical pulses representative of the reflective energy, means for rotating said energy emitting and receiving means about the longitudinal axis of said well tool so that said emitted energy will be sequentially directed at various circumferential portions of a well bore wall, means responsive to said rotation for producing an orientation signal representative of the orientation of said energy emitting and receiving means, and means for transmitting said electrical pulses and orientation signal to the surface of the earth;

means at the surface of the earth for receiving said transmitted pulses and orientation signal;

means for measuring the peak amplitude of said received pulses;

contrast control means for passing that portion of each pulse which is greater than a selected fraction of said measured peak amplitude;

means responsive to each passed pulse from said contrast control means for generating a control pulse having a preselected time duration;

variable gain or attenuation means for applying a selected gain or attenuation to said passed pulses to produce amplitude adjusted pulses;

means for measuring the peak amplitude of said amplitude adjusted pulses and storing a voltage proportional to said measured peak amplitude in response to each control pulse, said measuring and storing means being reset when said control pulse is in a predetermined state;

means for comparing said stored voltage with a reference voltage to produce a comparison signal;

means for averaging the comparison signal and adjusting the gain or attenuation of said variable gain or attenuation means to maintain said stored and reference voltage substantially equal on the average;

brightness adjustment means for adding a selected portion of each control pulse to the stored voltage output of said measuring and storing means to produce an output picture signal; and recording means including a record medium, means for generaing a radiant energy beam, means responsive to said orientation signal for repetitively sweeping said beam across said record medium in synchronism with the rotation of said energy emitting and receiving means, means for modulating said beam with said picture signal, and means for moving said record medium in correlation with the movement of said well tool to thereby produce a picture image of the well bore wall on said record medium, whereby said contrast control means maintains the picture contrast at a desired level, said gain control means maintains the peak brightness of the picture at a desired level on the average, and said brightness adjustment means sets a selected brightness bias into said picture image.

27. A well logging system comprising:

a well logging tool having transducer means, means for repetitively energizing said transducer means to emit energy into a media surrounding said well tool, means for producing a transmitted energy sync pulse representative of the time that said energy is emitted, means coupled to said transducer means for producing a received energy signal pulse representative of a portion of the emitted energy which is returned to said well tool, and means for transmitting said sync and signal pulses to the surface of the earth, said sync and received pulses being of opposite polarity;

means at the surface of the earth for receiving said transmitted pulses;

automatic gain control means for controlling the signal strength of said received pulses, said gain control means including gain adjustment means for adjusting the gain of said received pulses to produce gain adjusted pulses, gain determinng means responsive to the amplitude of said sync pulses for generating a gain control signal for application to said gain adjustment means to adjust the gain thereof, and means responsive to said signal pulses for inhibiting the application of any pulses to said gain determining means for a given time interval after each incident signal pulse; and means responsive to said gain adjusted signal pulses for obtaining an indication of the character of at least a portion of the media surrounding the well tool.

28. A well logging system comprising:

a well logging tool having transducer means, means for repetitively energizing said transducer means to emit acoustic energy into a media surrounding said well tool, means for rotating said transducer means about the longitudinal axis of said well tool so that said emitted energy will be sequentially directed at various circumferential portions of a borehole wall, means for producing a transmitted energy sync pulse representative of the time that said energy is emitted, means coupled to said transducer means for producing a received energy signal pulse representative of that portion of the emitted energy which is returned to said well tool, and means for transmitting said sync and signal pulses to the surface of the earth, said sync and received signal pulses being of opposite polarity;

means at the surface of the earth for receiving said transmitted pulses;

automatic gain control means for controlling the signal strength of said received pulses, said gain control means including gain adjustment means adapted for adjusting the gain of of said received pules to produce gain adjusted pulses, gain determining means for measuring the peak amplitude of the gain adjusted sync pulses, means for comparing said measured amplitude with a reference amplitude and generating a gain control signal representaitve of the difference therebetween for application to said gain adjustment means to adjust the gain there of until said measured amplitude is substantially equal to said reference amplitude, and means responsive to pulses of said signal pulse polarity for inhibiting the application of any pulses to said gain determining means for a given time interval after each incident signal so that said signal pulse overshoot portions will not be applied to said gain determining means; and means responsive to said gain adjusted signal pulses for obtaining an indication of the character of at least a portion of the media surrounding the well tool.

29. Apparatus for adjusting the signal strength of well logging signals derived from an exploring means of the type which repetitively emits energy into a media surrounding an exploring means and produces a sync pulse representative of the time of such emission as well as opposite polarity signal pulses representative of the media reaction to said emitted energy, comprising:

input means for receiving well logging signals;

automatic gain control means for adjusting the signal strength of said received well logging signals, said gain control means including gain adjustment means for adjusting the gain of said received signals to produce gain adjusted signals, gain determining means responsive to the amplitude of said sync pulses for generating a gain control signal for application to said gain adjustement means to adjust the gain thereof, and means responsive to said signal pulses for inhibiting the application of any pulses to said gain determining means for a given time interval; and means responsive to said gain adjusted signal pulses for obtaining an indication of the character of at least a portion of the media surrounding the well tool.

30. A well logging system comprising:

a well tool having means for repetitively emitting energy into a media surrounding said well tool and receiving at least a portion of said energy after each energy emission to develop electrical signal pulses representative thereof, means for generating a sync pulse for each energy emission representative of the time of each energy emission, and means for transmitting said sync and signal pulses to the surface of the earth;

means at the surface of the earth for receiving said transmitted pulses;

normalizing means responsive to the amplitude of said sync pulses for adjusting the amplitudes of said sync and signal pulses to render said sync pulse amplitude substantially equal to a reference amplitude, and generating normalized signal pulses from siad normalizing means;

automatic gain control means for adjusting the amplitude of said normalized signal pulses to maintain the amplitude level of said normalized signal pulses substantially equal to a reference amplitude and generating amplitude adusted output pulses; and means responsive to the amplitude adjusted output pulses for producing a record of at least a portion of the media surrounding said well tool.

31. A well logging system comprising:

a well tool having means for repetively emitting energy in selected directions into a media surrounding said well tool and receiving that portion of the emitted energy which is reflected back from a well bore wall to produce electrical pulses representative of the reflected energy, means for rotating said energy emitting and receiving means about the longitudinal axis of said well tool so that said emitted energy will be sequentially directed at various circumferential protions of a well bore wall, and means for transmitting said pulses to the surface of the earth;

means at the surface of the earth for receiving said transmitted pulses;

means for measuring the peak amplitude of said received pulses and generating an output signal representative thereof;

contrast control means for passing only that portion of each received pulse which exceeds a selected fraction of the measured peak amplitude output signal;

automatic gain control means for adjusting the amplitude of said pulses passed by said contrast control means to maintain the amplitude of said passed pulses substantially equal to a reference amplitude; and means responsive to said amplitude adjusted pulses for producing a record of the well bore wall.

32. A method of investigating a media surrounding a well tool, comprising:

repetitively emitting energy into a media surrounding said well tool and receiving at least a portion of said energy after each energy emission to develop electrical signal pulses representative thereof, generating a sync pulse for each energy emission representative of the time of each energy emission;

adjusting the amplitudes of said sync and signal pulses in response to the amplitude of said sync pulses to render said sync pulse amplitude substantially equal to a reference amplitude to thereby produce normalized signal pulses;

adjusting the amplitude of said normalized signal pulses in response to the average value of the peak amplitude of said signal pulses to maintain the peak amplitude level of said normalized signal pulses substantially equal to a reference amplitude on the average to thereby produce amplitude adjusted output pulses; and producing a record of at least a portion of the media surrounding said well tool in response to the amplitude adjusted output pulses.

33. A well logging system comprising:

a well logging tool having means for repetitively emitting and receiving energy in a media surrounding said well tool, means for producing a transmitted energy sync pulse representative of the time that said energy is emitted, means for producing a received energy signal pulse representative of the emitted energy which is returned to said well tool, and means for transmitting said sync and signal pulses to the surface of the earth, said sync and received signal pulses being of opposite polarity;

receiving means at the surface of the earth for receiving said transmitted pulses;

means for detecting said sync and signal pulses including first polarity sensitive means for generating a first output pulse whenever one of said received pulses exceeds a given amplitude level of the polarity corresponding to the polarity of said received sync pulses, second polarity sensitive means for generating a second output pulse whenever one of said received pulses exceeds a given amplitude level of the polarity corresponding to the polarity of said received signal pulses, signal gating means coupled to the output of said receiving means, enabling means responsive to said first output pulse for enabling said signal gating means during a selected time interval corresponding to the time interval relative to a sync pulse during which a received signal pulse is expected, means responsive to said second output pulse for disabling said enabling means for a selected time interval after each signal pulse is detected, which time interval is less than the minimum expected time interval between a signal pulse and succeeding sync pulse; and means responsive to said gated signal pulse from said signal gating means for providing a measure of a characteristic of a media surrounding the well tool.

34. In a well logging system of the type wherein a well logging tool repetitively emits and receives energy in a surrounding media and produces a sync pulse representative of the time that energy is emitted and a received energy signal pulse representative of the emitted energy which is returned to said well tool, said sync and signal pulses being transmitted in opposite polarity form to the surface of the earth, apparatus at the surface of the earth for processing said transmitted pulses, comprising:

receiving means at the surface of the earth for receiving said transmitted pulses;

means for detecting said sync and signal pulses, including first polarity sensitive means for generating a first ouput pulse whenever one of said received pulses exceeds a given amplitude level of the polarity corresponding to the polarity of said sync pulses, second polarity sensitive means for generating a second output pulse whenever one of said received pulses exceeds a given amplitude level of the polarity corresponding to the polarity of said received signal pulses; signal gating means coupled to the output of said receiving means, enabling means responsive to said first output pulse for enabling said signal gating means during a selected time interval corresponding to the time interval relative to a sync pulse which a received signal pulse is expected, means responsive to said second output pulse for disabling said enabling means for a selected time interval after each signal pulse is detected, which time interval is less than the minimum expected time interval between a signal pulse and succeeding sync pulse; and means responsive to said gated signal pulse from said signal gating means for providing a measure of a characteritic of a media surrounding the well tool.

35. A well logging system comprising:

a well logging tool having means for repetitively emitting and receiving energy in a media surrounding said well tool, means for producing a transmitted energy sync pulse representative of the time that said energy is emitted, means for producing a received energy signal pulse representative of the emitted energy which is returned to said well tool, and means for transmitting said sync and signal pulses to the surface of the earth, said sync and received signal pulses being of opposite polarity;

receiving means at the surface of the earth for receiving said transmitted pulses;

means for detecting said sync and signal pulses including first polarity sensitive means for generating a first output pulse whenever one of said received pulses exceeds a given amplitude level of the polarity corresponding to the polarity of said received sync pulses, second polarity sensitive means for generating a second ouput pulse whenever one of said received pulses exceeds a given amplitude level of the polarity corresponding to the polarity of said received signal pulses, first coincidence means responsive to said first output pulse and a first enabling pulse for generating a first coincidence pulse; means responsive to said first coincidence pulse for producing a second enabling pulse during a selected time interval corresponding to the time interval relative to a sync pulse during which a received signal pulse is expected, means responsive to said second output pulse for generating said first enabling pulse during a selected time interval after each signal pulse is detected, which time interval is less than the minimum expected time interval between a signal pulse and succeeding sync pulse, second coincidence means responsive to the coincidence of said second enabling pulse and said second output pulse for producing a second coincidence pulse, whereby said first and second coincidence pulses accurately correspond to the time relationship of said sync and signal pulses to one another; and means responsive to the time relationship of said first and second coincidence pulses for providing a measure of the well bore radius.

36. In a well logging system of the type wherein a well logging tool repetitively emits and receives energy in a surrounding media and produces a sync pulse representative of the time that energy is emitted and a received energy signal pulse representative of the emitted energy which is returned to said well tool, said sync and signal pulses being transmitted in opposite polarity form to the surface of the earth, apparatus at the surface of the earth for receiving and detecting said pulses, comprising:

first polarity sensitive means for generating a first output pulse whenever one of said received pulses exceeds a given amplitude level of the polarity corresponding to the polarity of said received sync pulses;

second polarity sensitive means for generating a second output pulse whenever one of said received pulses exceeds a given amplitude level of the polarity corresponding to the polarity of said received signal pulses;

first coincidence means responsive to said first ouptut pulse and a first enabling pulse for generating a first coincidence pulse;

enabling means responsive to said first pulse coincidence pulse for producing a second enabling pulse during a selected time interval corresponding to the time interval relative to a sync pulse during which a received signal pulse is expected;

means responsive to said second ouptut pulse for generating said first enabling pulse during a selected time interval after each signal pulse is detected, which time interval is less than the minimum expected time interval between a signal pulse and succeeding sync pulse; and second coincidence means responsive to the coincidence of said second enabling pulse and said second output pulse for producing a second coincidence pulse whereby said first and second coincidence pulses accurately correspond to the time relationship of said sync and signal pulses to one another.

37. A well logging system comprising:

a well logging tool having transducer means, means for repetitively energizing said transducer means to emit energy into a media surrounding said well tool, means for producing transmitted energy sync pulses representative of the times that said energy is emitted, means coupled to said transducer means for producing a received energy signal pulse representative of the emitted energy which is returned to said well tool after each energy emission, and means for transmitting said sync and signal pulses to the surface of the earth;

means at the surface of the earth for receiving said transmitted pulses; and means for displaying said sync and signal pulses, said displaying means comprising a cathode ray tube oscilloscope having horizontal and vertical beam deflection inputs, means responsive to said sync pulses for generating delay pulses, each having an on-time period slightly less than the time period between successive sync pulses, means responsive to the trailing edges of said delay pulses for generating a sawtooth wave signal for application to the horizontal beam deflection input of said oscilloscope to cause the electron beam to be repetitively swept across the face of said oscilloscope, means for applying both the sync and signal pulses to the vertical beam deflection input of said oscilloscope whereby both the sync and signal pulses will be displayed on the face of said oscilloscope.

38. In a well logging system of the type where a well logging tool repetitively emits and receives energy in a media surrounding said well tool and produces transmitted energy sync pulses representative of the times that said energy is emitted, and also produces received energy signal pulses representative of the emitted energy which is returned to said well tool after each energy emission, apparatus at the surface of the earth for displaying said pulses, comprising:

a cathode ray tube oscilloscope having horizontal and vertical beam deflection inputs;

means responsive to said sync pulses for generating delay pulses, each having an on-time period slightly less than the time period between successive sync pulses;

means responsive to the trailing edges of said delay pulses for generating a sawtooth wave signal for application to the horizontal beam deflection input of said oscilloscope to cause the electron beam to be repetitively swept across the face of said oscilloscope; and means for applying both the sync and signal pulses to the vertical beam deflection input of said oscilloscope whereby both the sync and signal pulses will be displayed on the face of said oscilloscope.

39. The apparatus of claim 38 wherein said means for generating a sawtooth wave signal includes a capacitor, means for applying current to said capacitor to produce a ramp voltage across said capacitor, means responsive to the trailing edge of each delay pulse for resetting the voltage across said capacitor to a predetermined reference voltage.

40. A well logging system, comprising:
a longitudinally extending support member;
a rotatable shaft supported by said support member for rotation;
directional transducer means mounted on said shaft for rotation;

a pair of spaced apart magnetic members mounted on opposite sides of said shaft in a relative orientation with said directional transducer and arranged to receive a portion of the earth's magnetic field, the portion of said shaft lying between said pair of sectorial members being made of a magnetic material;

an induction coil supported by the support member and magnetically coupled with said magnetic shaft portion to produce an azimuth signal in response to variations of magnetic flux through said magnetic shaft portion to thereby enable a determination of the azimuthal direction of said directional transducer means;

means for repetitively energizing said transducer means to emit energy into a media surrounding said support member and receiving energy reflected back from portions of a surrounding media to develop electrical signals representative of said repetitively received energy; and recording means for recording said electrical signals, said recording means including a recording medium, means for producing a radiant energy beam and repetitively sweeping said beam across said recording medium in response to said azimuth signals so that said beam will be swept in synchronism with the rotation of said diretional transducer means, and means for modulating said beam with said representations of said received energy signals to thereby produce a picture image of a portion of the surrounding media.

41. A well logging system, comprising:
a longitudinally extending support member;
magnetic field generating means for generating a directional magnetic field;
magnetic field detecting means supported by said support member and located in magnetic proximity to said magnetic field generating means for producing an electrical output signal in response to said generated magnetic field;
a directional transducer means;
rotational means supported by said support member for rotation and supporting said directional transducer means and said magnetic field generating means for rotation, whereby the rotation of said rotational means will produce variations in the magnetic field strength sensed by said magnetic field detecting means to thereby produce said output signal which is representative of the orientation of said rotational means relative to said support member;

means for repetitively energizing said transducer means to emit energy into a media surrounding said support member and receiving energy reflected back from portions of a surrounding media to develop electrical signals representative of said repetitively received energy; and recording means for recording said electrical signals, said recording means including a recording medium, means for producing a radiant energy beam and repetitively sweeping said beam across said recording medium in response to said output orientation signal so that said beam will be swept in synchronism with the rotation of said directional transducer means, and means for modulating said beam with representations of said received energy signals to thereby produce a picture image of a portion of the surrounding media.

42. A logging system for use in a well bore comprising:
an elongated tool having rotatable acoustic transducer means for scanning the circumference of a well bore, downhole means for repetitively obtaining a series of signals during each revolution of said transducer means, each series being representative of at least the time of transmission of acoustic energy and time of returned acoustic energy;
means coupled to said downhole means for selecting relative to each revolution a first series of signals representative of the minimum time occurring between transmission and return of acoustic energy, and for selecting a second series of signals representative of the maximum time occurring between transmission and return of acoustic energy, and means coupled to said downhole means for averaging a number of series of signals representative of the time occurring between transmission and return of acoustic energy during each revolution; and
means for independently recording an indication of said first and second series of signals and said representative average signals.

43. Apparatus for providing indications of well logging information derived from a well logging system of the type which produces a synchronizing signal representative of a given event and an information signal representative of a selected downhole characteristic, comprising:
indicating means;
sweeping means responsive to said synchronizing signal for sweeping a radiant energy beam across said indicating means; and
means for modulating the intensity of said beam with representations of said information signal, said modulating means including amplitude discrimination means adapted for producing a signal having one of at least two amplitude levels when the amplitude of the information signal is within a given amplitude range for modulating said beam intensity.

44. Apparatus for providing indications of well logging information derived from a well logging system of the type which produces a synchronizing signal representative of a given event and an information signal representative of a selected downhole characteristic, comprising:
indicating means;
sweeping means responsive to said synchronizing signal for sweeping a radiant energy beam across said indicating means; and
means for modulating the intensity of said beam with representations of said information signal, said modulating means including amplitude discriminations means adapted for producing a signal having a first amplitude level when the amplitude of the information signal is within a first amplitude range and a signal having a second amplitude when the information signal is within a second amplitude range for modulating said beam intensity whereby first and second levels of intensity of said indications will be produced on said indicating means.

45. A well logging system comprising:
a well tool having means for repetitively emitting energy in a selected direction into a media surrounding said well tool and receiving that portion of the emitted energy which is reflected back from a well bore wall to produce electrical pulses representative of the reflected energy, means for rotating said energy emitting and receiving means about the longitudinal axis of said well tool so that said emitted energy will be sequentially directed at various circumferential portions of a well bore wall;
means for generating a reference signal having a selectable reference amplitude;
automatic gain control means for comparing the amplitudes of said reflected energy pulses with said reference amplitude and adjusting the signal strength of said reflected energy pulses to maintain the amplitude of said reflected energy pulses substantially equal to said reference amplitude;
variable gain or attenuation means responsive to said reflected energy pulses for producing signal strength adjusted pulses;
means for comparing the peak amplitude of said signal strength adjusted pulses with said reference amplitude and generating a difference signal representative of the amplitude difference therebetween;
low-pass filter means for filtering out high frequency components of said difference signal to produce an average difference signal;
means for applying said average difference signal to said variable gain or attenuation means to adjust the gain or attenuation thereof so that the peak amplitude of said signal strength adjusted pulses will substantially equal said reference amplitude on the average; and
means responsive to the adjusted signal strength pulses for producing a record of the condition of at least a portion of the media surrounding said well tool.

* * * * *

PO-1050
(5/69)

UNITED STATES PATENT OFFICE
CERTIFICATE OF CORRECTION

Patent No. 3,724,589              Dated April 3, 1973

Inventor(s) Joseph E. Chapman, III

It is certified that error appears in the above-identified patent and that said Letters Patent are hereby corrected as shown below:

REFERENCES CITED:

"Zemaner" should be --Zemanek-- (four occurrences);
U.S. Pat. No. 2,595,241 issue date "5/1962" should be --5/1952--;
U.S. Pat. No. "435,224" should be --3,435,224--;
"Whiteill, Jr." should be --Whitfill, Jr.--;

SPECIFICATION:

Col. 3, lines 24-25, "substracted" should be --subtracted--;
Col. 5, line 37, "aximuth" should be --azimuth--;
Col. 7, line 24, "anlysis" should be --analysis--;
      line 25, "representaing" should be --representing--;
      line 48, "relfected" should be --reflected--;
Col. 9, lines 25 and 26, "attached" should be --attach--;
      line 68, "cylndrical" should be --cylindrical--;

Col. 12, line 13, "refernce" should be --reference--;
      line 57, "s$_o$" should be --S$_o$--;
Col. 13, line 7, "Reflectd" should be --Reflected--;
      line 26, delete "in" (second occurrence);
Col. 14, line 36, delete "to" (first occurrence);
Col. 15, line 4, "apprecitaed" should be --appreciated--;
      line 41, "pules" should be --pulses--; "ga" should be --gain--;
Col. 16, line 44, "a resistor of aresistor" should be --way of a resistor--;
Col. 22, line 39, "wll" should be --will--;
Col. 24, line 19, "revoltuion" should be --revolution--;
      line 38, "caacitor" should be --capacitor--;
Col. 29, line 51, "borehold" should be --borehole--;
      line 55, "tansducer" should be --transducer--;
Col. 31, line 9, "gfain" should be --gain--;

UNITED STATES PATENT OFFICE
CERTIFICATE OF CORRECTION

Patent No. 3,724,589  Dated April 3, 1973

Inventor(s) Joseph E. Chapman, III

It is certified that error appears in the above-identified patent and that said Letters Patent are hereby corrected as shown below:

Col. 32, line 53, "pulses" should be --pulse--;
Col. 34, line 56, "directons" should be --directions--;
Col. 35, line 36, "generaing" should be --generating--;
Col. 36, line 5, "determinng" should be --determining--;
line 40, delete "of" (second occurrence);
line 41, "pules" should be --pulses--;
line 46, "representaitve" should be --representative--;
line 48, "there of" should be --thereof--;
Col. 37, line 8, "adjustement" should be --adjustment--;
line 35, "siad" should be --said--;
line 41, "adusted" should be --adjusted--;
line 56, "protions" should be --portions--;
Col. 39, line 19, "ouptut" should be --output--;
line 41, "characteritic" should be --characteristic--;
line 61, "ouptut" should be --output--;
Col. 40, lines 42-43, "ouptut" should be --output--;
line 50, "ouptut" should be --output--;
Col. 42, line 28, "diretional" should be --directional--;
Col. 44, lines 5-6, "discriminations" should be --discrimination--.

Signed and sealed this 8th day of January 1974.

SEAL]
Attest:

EDWARD M. FLETCHER, JR.
Attesting Officer

RENE D. TEGTMEYER
Acting Commissioner of Patents